(12) United States Patent
Bhandal et al.

(10) Patent No.: US 6,711,602 B1
(45) Date of Patent: Mar. 23, 2004

(54) DATA PROCESSOR WITH FLEXIBLE MULTIPLY UNIT

(75) Inventors: Amarjit Singh Bhandal, Northants (GB); Keith Balmer, Bedford (GB); David Hoyle, Glendale, AZ (US); Karl M. Guttag, Dallas, TX (US); Zahid Hussain, Ascot (GB)

(73) Assignee: Texas Instruments Incorporated, Dallas, TX (US)

( * ) Notice: Subject to any disclaimer, the term of this patent is extended or adjusted under 35 U.S.C. 154(b) by 426 days.

(21) Appl. No.: 09/703,093

(22) Filed: Oct. 31, 2000

Related U.S. Application Data

(60) Provisional application No. 60/183,527, filed on Feb. 18, 2000, and provisional application No. 60/183,654, filed on Feb. 18, 2000.

(51) Int. Cl.[7] .................................................. G06F 7/52
(52) U.S. Cl. ....................................................... 708/625
(58) Field of Search ........................................ 708/625

(56) References Cited

U.S. PATENT DOCUMENTS

| | | | | |
|---|---|---|---|---|
| 5,095,456 A | * | 3/1992 | Wong et al. ................. | 708/625 |
| 5,446,651 A | * | 8/1995 | Moyse et al. ................ | 708/630 |
| 5,623,683 A | * | 4/1997 | Pandya ........................ | 708/625 |
| 5,961,635 A | | 10/1999 | Guttag et al. ................ | 712/221 |
| 6,032,170 A | * | 2/2000 | Guttag et al. ................ | 708/620 |
| 6,038,583 A | * | 3/2000 | Oberman et al. ............ | 708/628 |
| 6,301,599 B1 | * | 10/2001 | Chehrazi et al. ............. | 708/628 |
| 6,347,326 B1 | * | 2/2002 | Jensen et al. ................ | 708/625 |
| 6,421,698 B1 | * | 7/2002 | Hong .......................... | 708/490 |

* cited by examiner

*Primary Examiner*—David H. Malzahn
(74) *Attorney, Agent, or Firm*—Robert D. Marshall, Jr.; W. James Brady, III; Frederick J. Telecky, Jr.

(57) ABSTRACT

An embodiment of the invention includes a pair of parallel 16×16 multipliers each with two 32-bit inputs and one 32-bit output. There are options to allow input halfword and byte selection for four independent 8×8 or two independent 16×16 multiplications, real and imaginary parts of complex multiplication, pairs of partial sums for 32×32 multiplication, and partial sums for 16×32 multiplication. There are options to allow internal hardwired routing of each multiplier unit results to achieve partial-sum shifting as required to support above options. There is a redundant digit arithmetic adder before final outputs to support additions for partial sum accumulation, complex multiplication vector accumulation and general accumulation for FIRs/IIRs—giving MAC unit functionality. There are options controlled using bit fields in a control register passed to the multiplier unit as an operand. There are also options to generate all of the products needed for complex multiplication.

16 Claims, 22 Drawing Sheets

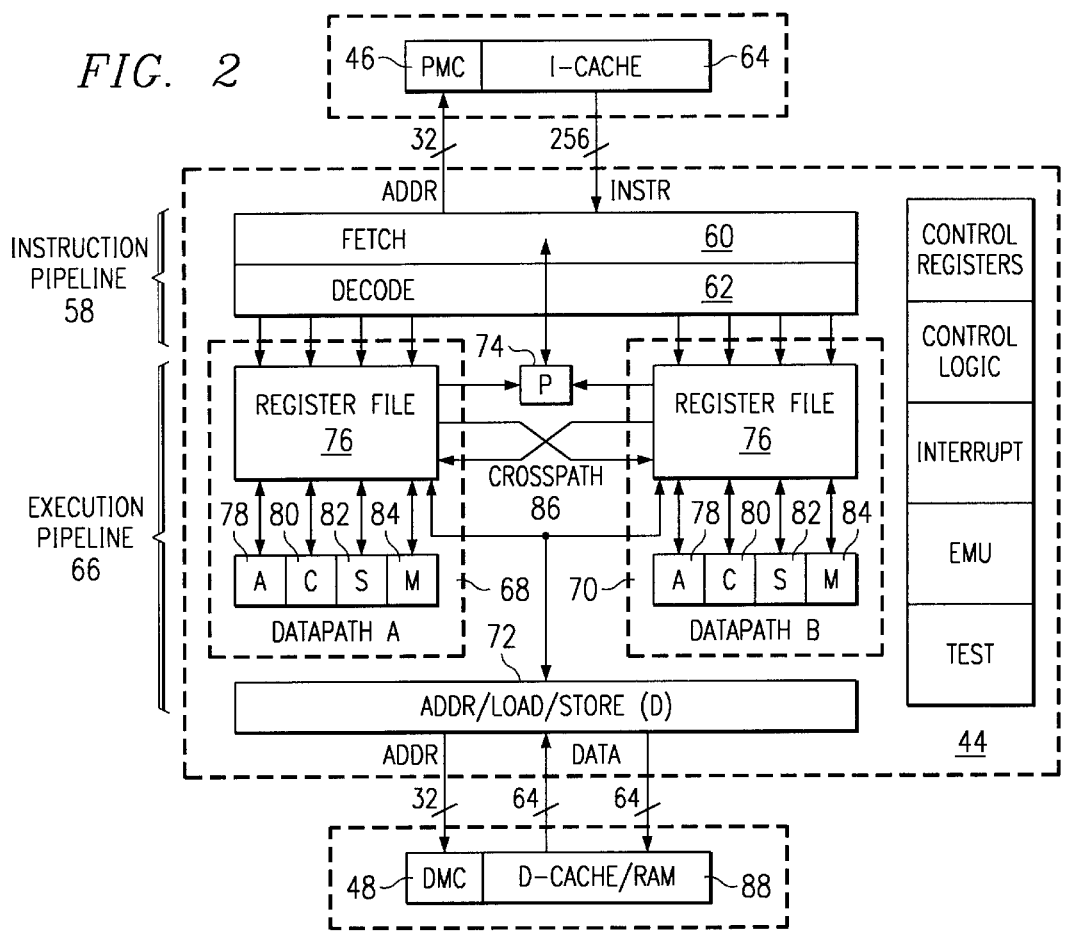

FIG. 2

| UNIT GROUP | OPERATIONS | REGISTER FILE ACCESS | |
|---|---|---|---|
| | | PRIMARY DATAPATH | ALTERNATIVE DATAPATH |
| A | - GENERAL ARITHMETIC<br>- BOOLEAN AND CONTROL REGISTER ACCESS | R/W | R |
| C | - COMPARE, SHIFT, BOOLEAN<br>- ARITHMETIC: ADD, SUB | R/W | R |
| S | - SHIFT, ROTATE, EXTENDED BOOLEAN<br>- ARITHMETIC: ADD, SUB | R/W | R |
| M | - MULTIPLY<br>- ARITHMETIC: ADD, SUB | R/W | R |
| D | - LOAD<br>- STORE<br>- ADDRESS COMPUTATION | W TO BOTH<br>R FROM BOTH<br>R/W BOTH | |
| P | - BRANCH | R FROM BOTH | |

FIG. 3         R=READ, W=WRITE

| || [PREDICATION REG] INSTRUCTION_MNEMONIC .UNIT-DATAPATH-CROSSPATH OP1, OP2, DST |||||
|---|---|---|---|---|
| WHERE: ||||||
| || | =TO BE SCHEDULED IN PARALLEL WITH PRECEDING INSTRUCTION(S) |||||
| [PREDICATION REG] =REGISTER CONTAINING PREDICATION VALUE |||||
| .UNIT =A,C,S,M,D,P UNIT GROUPS |||||
| DATAPATH =1 FOR DATAPATH A, 2 FOR DATAPATH B |||||
| CROSSPATH =X IF ONE OPERAND COMES FROM OPPOSITE REGISTER FILE |||||
| OP1, OP2 =SOURCE REGISTERS |||||
| DST =DESTINATION REGISTER |||||

| UNIT GROUP | ASSEMBLY NOTATIONS || ASSEMBLY EXAMPLES | WITH CROSSPATH |
|---|---|---|---|---|
| | DATAPATH A | DATAPATH B | | |
| A | .A1 | .A2 | ADD .A1 A1,A2,A3<br>SUB .A2 B1,B2,B3 | ADD .A1X A1,B2,A3<br>SUB .A2X B1,A2,B3 |
| C | .C1 | .C2 | CMPEQ .C1 A1,A2,A3<br>CMPEQ .C2 B1,B2,B3 | CMPEQ .C1X A1,B2,A3<br>CMPEQ .C2X B1,A2,B3 |
| S | .S1 | .S2 | SHL .S1 A1,A2,A3<br>SHL .S2 B1,B2,B3 | SHL .S1X A1,B2,A3<br>SHL .S2X B1,A2,B3 |
| M | .M1 | .M2 | MPY .M1 A1,A2,A3<br>MPY .M2 B1,B2,B3 | MPY .M1X A1,B2,A3<br>MPY .M2X B1,A2,B3 |
| D | .D || LDB .D *A8,A12<br>STB .D A8,*A12<br>ADDAH .D A8,A2,B1 | n/a |
| P | .P || B A8 | n/a |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | - | 1 | SIZE | | | - | - | POLYNOMIAL | | | | | | | | - | - | - | - | - | - | - | - | - | - | - | - | - | - | - | 1 |

1020 — SIZE
1010 — POLYNOMIAL
900

GALOIS MULTIPLIES: (OPER=1xxx)
- ALL EMPY FIELDS OTHER THAN OPER AND POLYNOMIAL ARE REQUIRED TO BE ZERO.
- POLYNOMIAL IS SPECIFIED BY BITS 23–16.
- DATA, RESULTS AND POLYNOMIAL ARE LEFT JUSTIFIED WITHIN THE 8-BIT FIELDS IF NOT 8-BITS IN SIZE.
- A GALOIS MPY USING PEMPYHL WOULD DO THE FOLLOWING:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| xxxxxxxx | | | | | | | | xxxxxxxx | | | | | | | | DATA A | | | | | | | | DATA B | | | | | | | OP1 |
| xxxxxxxx | | | | | | | | xxxxxxxx | | | | | | | | DATA C | | | | | | | | DATA D | | | | | | | XOP2 |
| xxxxxxxxxxxxxxxx | | | | | | | | | | | | | | | | A GMPY C | | | | | | | | B GMPY D | | | | | | | dst |

PAIR OF 16 BY 16 BIT MULTIPLIES
A*C | B*D

| src1 H<br>A | src1 L<br>B | | src2 H<br>C | src2 L<br>D |
|---|---|---|---|---|

```
    A * C              B * D    ⎫
    A * D              B * D    ⎬ POSSIBLE
    A * C              B * C    ⎨ COMBINATIONS
    A * D              B * C    ⎭

>> 0-16            << 0-16      - OPTIONAL SCALING

>> 0               >> 0         - NO P SHIFT
    A * C              B * D        - EXAMPLE COMBINATION,
                                      NO ADDITION
    dst+1              dst          - OUTPUT STORAGE
```

| A * C | | B * D |
|---|---|---|

FIG. 11A

PAIR OF 16 BY 16 BIT MULTIPLIES AND SUM
A*C + B*D

| src1 H<br>A | src1 L<br>B | | src2 H<br>C | src2 L<br>D |
|---|---|---|---|---|

```
      A * C                B * D           - SELECTED COMBINATION

>> 0-16              << 0-16         - OPTIONAL SCALING

>> 32                >> 0            - P SHIFT
      A * C         +      B * D           - ADDITION
      dst+1                dst             - OUTPUT STORAGE
```

| OVERFLOW IF ANY | (A*C) + (B*D) |
|---|---|

FIG. 11B

COMPLEX NUMBER MULTIPLY - REAL PART
(A + jB) * (C + jD) = (A*C - B*D) + j(A*D + B*C)

| src1 H | src1 L |
|--------|--------|
| A      | B      |

| src2 H | src2 L |
|--------|--------|
| C      | D      |

A * C            B * D     - MULTIPLY COMBINATION

>> 0-16         >> 0-16     - OPTIONAL SCALING

>> 32           << 0       - P SHIFT (A*C) - (B*D)  - SUBTRACTION dst+1           dst        - OUTPUT STORAGE

| 0      0 |
|----|

| (A*C) - (B*D) |
|---------------|

FIG. 11C

COMPLEX NUMBER MULTIPLY - IMAGINARY PART
(A + jB) * (C + jD) = (A*C - B*D) + j(A*D + B*C)

| src1 H | src1 L |
|--------|--------|
| A      | B      |

| src2 H | src2 L |
|--------|--------|
| C      | D      |

A * D            B * C     - MULTIPLY COMBINATION

>> 0-16         >> 0-16     - OPTIONAL SCALING

>> 32           << 0       - P SHIFT (A*D) + (B*C)  - ADDITION dst+1           dst        - OUTPUT STORAGE

| 0      0 |
|----|

| (A*D) + (B*C) |
|---------------|

FIG. 11D

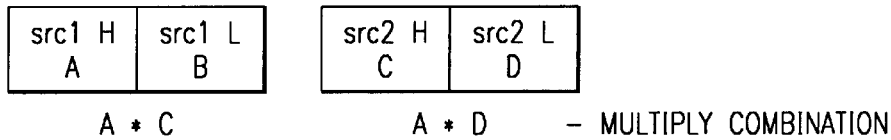

32 BIT MULTIPLY - FIRST PART
$(A*2**16 + B) * (C*2**16 + D) = A*C*2**32 + A*D*2**16 + B*C*2**16 + B*D$

| src1 H<br>A | src1 L<br>B | | src2 H<br>C | src2 L<br>D |
|---|---|---|---|---|

A * C              A * D         - MULTIPLY COMBINATION

>> 0-16          >> 0-16       - OPTIONAL SCALING

>> 0              << 16        - P SHIFT (A*C) - (A*D)     - ADDITION dst+1             dst         - OUTPUT STORAGE

FIG. 11E

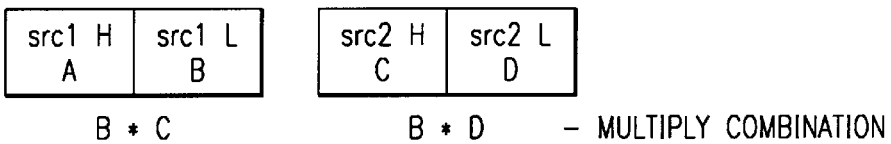

32 BIT MULTIPLY - SECOND PART
$(A*2**16 + B) * (C*2**16 + D) = A*C*2**32 + A*D*2**16 + B*C*2**16 + B*D$

| src1 H<br>A | src1 L<br>B | | src2 H<br>C | src2 L<br>D |
|---|---|---|---|---|

B * C              B * D         - MULTIPLY COMBINATION

>> 0-16          >> 0-16       - OPTIONAL SCALING

>> 16            << 0         - P SHIFT (B*C) + (B*D)     - ADDITION dst+1             dst         - OUTPUT STORAGE

FIG. 11F

QUAD 8 BIT BY 8 BIT MULTIPLY

| A | B | C | D |  | E | F | G | H |

A*E : B*F          C*G : D*H      — MULTIPLY COMBINATION

>> 0-16            >> 0-16        — OPTIONAL SCALING

>> 0               << 0           — P SHIFT
A*E : B*F          C*G   D*H      — NO ADDITION dst+1              dst            — OUTPUT STORAGE

| A*E | B*F |  | C*G | D*H |

*FIG. 11G*

QUAD 8 BIT BY 8 BIT MULTIPLY/ACCUMULATE
INTO 2 SUMS, FIRST VARIATION

| A | B | C | D |  | E | F | G | H |

A*E : B*F          C*G : D*H      — MULTIPLY COMBINATION

>> 0-16            >> 0-16        — OPTIONAL SCALING

>> 16 | >> 32      << 16 | << 0   — P SHIFT
A*E : C*G          B*F + D*H      — TWO SEPARATE 32 BIT ADDITIONS dst+1              dst            — OUTPUT STORAGE

| A*E + C*G | B*F + D*H |

*FIG. 11H*

QUAD 8 BIT BY 8 BIT MULTIPLY/ACCUMULATE
INTO 2 SUMS, SECOND VARIATION

| A | B | C | D |    | E | F | G | H |

A*E : B*F          C*G : D*H    — MULTIPLY COMBINATION

\>> 0-16             \>> 0-16      — OPTIONAL SCALING

\>> 16 | \>> 0      \>> 16 | << 0   — P SHIFT
A*E + B*F         C*G + D*H   — TWO SEPARATE 32 BIT ADDITIONS dst+1              dst        — OUTPUT STORAGE

| A*E + B*F |    | C*G + D*H |

| SOURCE | DEST | | INSTRUCTION GROUPS | | | | | | | | |
|---|---|---|---|---|---|---|---|---|---|---|---|
| | | | 1 | 2 | 3 | 4 | 5 | 6 | 7 | 8 | 9 |
| src 1 HIGH | MPY 0 | src 1 | | | x | x | | x | x | x | x |
| src 1 LOW | | src 1 | !K | x | | | x | | | | |
| SCST5 | | | K | | | | | | | | |
| src 2 HIGH | | src 2 | | | | !X | | !X | !X | | !X |
| src 2 LOW | | src 2 | !X | !X | | !X | | | !X | !X | |
| XPATH HIGH | | src 2 | | | | X | | X | X | | X |
| XPATH LOW | | src 2 | X | X | | X | | | X | X | |
| src 1 HIGH | MPY 1 | src 1 | | | x | x | | | | | |
| src 1 LOW | | src 1 | !K | x | | | x | x | x | x | x |
| SCST5 | | | K | | | | | | | | |
| src 2 HIGH | | src 2 | | | | | !X | | !X | | !X |
| src 2 LOW | | src 2 | !X | !X | !X | !X | | !X | | !X | |
| XPATH HIGH | | src 2 | | | | | X | | X | | X |
| XPATH LOW | | src 2 | X | X | X | X | | X | | X | | x – SELECT THIS SOURCE TO DESTINATION FOR THIS INSTRUCTION GROUP
K – SELECT THIS SOURCE TO DESTINATION IF USING CONSTANT INSTRUCTION FORM
!K – SELECT THIS SOURCE TO DESTINATION IF NOT USING CONSTANT INSTRUCTION FORM
X – SELECT THIS SOURCE TO DESTINATION IF USING CROSS PATH
!X – SELECT THIS SOURCE TO DESTINATION IF NOT USING CROSS PATH

FIG. 13

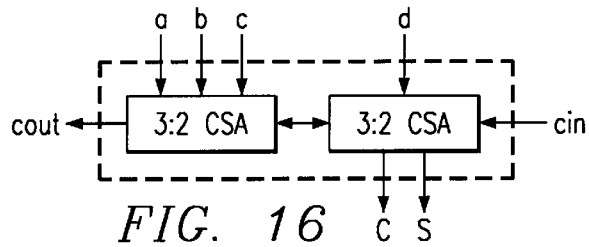

FIG. 16

```
sign_op: ON IF EITHER src1 OR src2 IS SIGNED-NUMBER
j48: JOIN AT BIT 48
j32: JOIN AT BIT 32
j16: JOIN AT BIT 16
```

1. AS0:

```
              63              47              31              15              0
* AS0='00'  |_____|_____|Axxxxxxxxxxxxxxx|Bxxxxxxxxxxxxxxx|
    IF (sign_op AND j32)         {(47:32) <= A};
    IF (sign_op AND j32 AND j48) {(63:48) <= A};

63              47              31              15              0
* AS0='01'  |_____|Axxxxxxxxxxxxxxx|_____|Bxxxxxxxxxxxxxxx|
    IF (sign_op AND j48)         {(63:48) <= A};
    IF (sign_op AND j16)         {(31:16) <= B};

63              47              31              15              0
* AS0='10'  |_____|Axxxxxxxxxxxxxxx|Bxxxxxxxxxxxxxxx|_____|
    IF (sign_op AND j48)         {(63:48) <= A};
```

2. AS1:

```
              63              47              31              15              0
* AS1='00'  |Axxxxxxxxxxxxxxx|Bxxxxxxxxxxxxxxx|_____|_____|

63              47              31              15              0
* AS1='01'  |_____|Axxxxxxxxxxxxxxx|Bxxxxxxxxxxxxxxx|_____|
    IF (sign_op AND j48)         {(63:48) <= A};

63              47              31              15              0
* AS1='10'  |_____|Axxxxxxxxxxxxxxx|_____|Bxxxxxxxxxxxxxxx|
    IF (sign_op AND j48)         {(63:48) <= A};
    IF (sign_op AND j16)         {(31:16) <= B};

63              47              31              15              0
* AS1='11'  |_____|_____|Axxxxxxxxxxxxxxx|Bxxxxxxxxxxxxxxx|
    IF (sign_op AND j32)         {(47:32) <= A};
    IF (sign_op AND j32 AND j48) {(63:48) <= A};
```

FIG. 17

DATA PROCESSOR WITH FLEXIBLE MULTIPLY UNIT

This application claims priority under 35 USC §119(e)(1) of Provisional Application No. 60/183,527, filed Feb. 18, 2000 and of Provisional Application No. 60/183,654, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone, of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to memory access schemes of microprocessors optimized for digital signal processing.

BACKGROUND

Generally, a microprocessor is a circuit that combines the instruction-handling, arithmetic, and logical operations. of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units, referred to as a Very Long Instruction Word (VLIW) architecture.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner.

For example, a DSP generally has a specialized multiply-accumulate (MAC) unit in order to improve the performance of repetitive digital signal processing algorithms.

The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor with a versatile multiplier unit that improves digital signal processing performance. Aspects of the invention are specified in the claims.

An embodiment of the invention includes a pair of parallel 16×16 multipliers each with two 32-bit inputs and one 32-bit output. There are options to allow input halfword and byte selection for: four independent 8×8 or two independent 16×16 multipliers, real and imaginary parts of complex multiplication, pairs of partial sums for 32×32 multiplication, partial sums for 16×32 multiplication. For complex multiplication, the products are of the form: (a+bj)*(c+dj)=(ac−bd)+j(bc+ad).

In another embodiment of the invention there are options to allow internal hardwired routing of each multiplier unit results to achieve partial-sum shifting as required to support above options.

In another embodiment of the invention there is a redundant digit arithmetic adder before final outputs to support additions for partial sum accumulation, complex multiplication vector accumulation and general accumulation for FIRs/IIRs—giving MAC unit functionality.

In another embodiment of the invention there are options controlled using bit fields in a control register passed to the multiplier unit as an operand.

BRIEF DESCRIPTION OF THE DRAWINGS

Other features and advantages of the present invention will become apparent by reference to the following detailed description when considered in conjunction with the accompanying drawings in which the Figures relate to the processor of FIG. 2 unless otherwise stated, and in which:

FIG. 2 is a top-level block diagram of a DSP cluster from the digital system of FIG. 1;

FIG. 3 is, a chart of the resource availability and register file access for the datapath unit groups in the DSP cluster of FIG. 2;

FIG. 6 is a chart of the basic assembly formiat for the DSP core instructions;

FIG. 10 illustrates the EMPY register of FIG. 9 configured for a Galois field multiplication;

FIGS. 11A, 11B, 11C, 11D, 11E, 11F, 11G, 11H, and 11I are flow charts illustrating various multiply operations that can be performed by the paired multiply units of FIG. 7–8;

FIG. 12 is a timing diagram illustrating operation of the instruction pipeline of the DSP while executing multiply instructions;

FIG. 13 is a table that defines decode control signals for the input multiplexers of FIG. 7;

FIG. 16 illustrates one portion of the 4:2 CSA of FIG. 15 in more detail;

FIG. 17 illustrates operation of the A-shift circuitry of FIG. 7;

Corresponding numerals and symbols in the different figures and tables refer to corresponding parts unless otherwise indicated.

DETAILED DESCRIPTION OF EMBODIMENTS OF THE INVENTION

Figure 1:
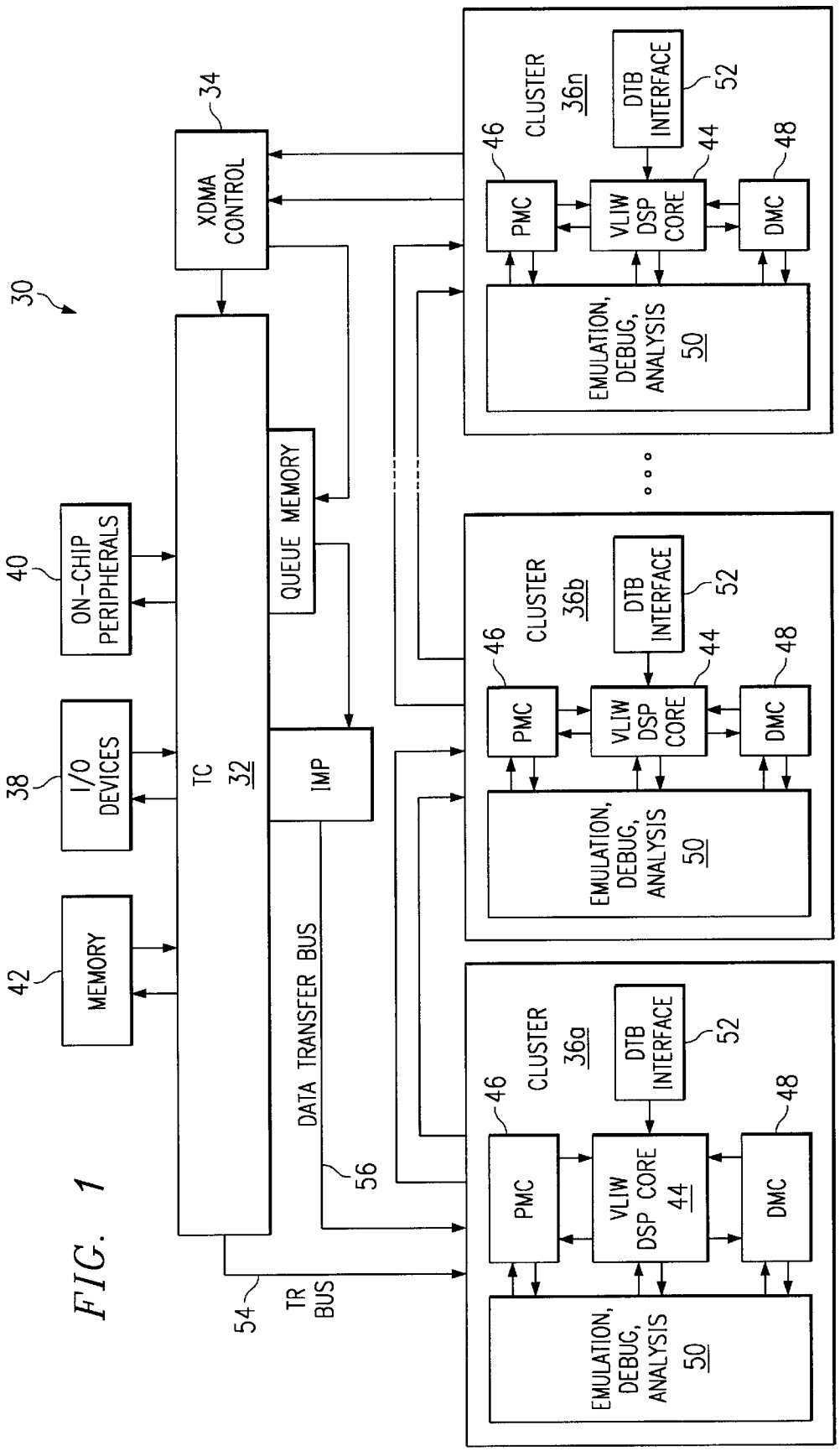
FIG. 1 is a top-level block diagram of a digital system that embodies the present invention.

According to a preferred embodiment of the present invention, a microprocessor architecture is provided including certain advantageous features. FIG. 1 is a high-level block diagram of an exemplary digital system 30 in which an embodiment of the invention is presented. In the interest of clarity, FIG. 1 shows only those portions of digital system 30 that may be relevant to an understanding of an embodiment of the present invention. Details of the general construction of microprocessors are well known, and may be found readily elsewhere. For example, U.S. Pat. No. 5,072, 418 issued to Frederick Boutaud, et al., describes a DSP in detail and is incorporated herein by reference. Details of portions of microprocessor 30 relevant to an embodiment of the present invention are explained in sufficient detail below so as to enable one of ordinary skill in the microprocessor art to make and use the invention.

Generally, digital system 30 comprises Transfer Controller (TC) 32, External Direct Memory Access (XDMA) Controller 34, and DSP clusters 36a–36n. Transfer Controller 32 provides for all data communication among DSP clusters 36a–36n, external input/output (I/O) devices 38, on-chip peripherals 40, and memory 42. While any given cluster such as DSP cluster 36a can access its own internal local memory within the cluster without permission from TC 32, any access to global memory outside of its local memory requires a TC directed data transfer, whether the access is to external memory or to another DSP cluster's own local memory. XDMA Controller 34 provides handling of externally initiated DMA requests while avoiding interrupting any DSP clusters 36a–36n. Each DSP cluster 36 comprises a very long instruction word (VLIW) DSP core 44, Program Memory Controller (PMC) 46, Data Memory Controller (DMC) 48, an emulation, analysis and debug block 50, and Data Transfer Bus (DTB) interface 52. DSP clusters 36 and TC 32 communicate over a pair of high throughput buses: Transfer Request (TR) bus 54, which is used to specify and request transactions in TC 32, and DTB 56, which is used to load and store data from objects in the global memory map. The overall architecture is scaleable, allowing for the implementation of up to 255 DSP clusters 36, although only three DSP clusters 36 are included in the present embodiment. It should be noted that architectural details, such as the number of DSP clusters 36, and instruction set details are not essential to the invention. The microprocessor architecture outlined in FIG. 1 is exemplary only, and the invention is applicable to many microprocessor architectures.

FIG. 2 is a high-level block diagram illustrating more detail of DSP core 44. DSP core 44 is a 32-bit eight-way VLIW pipelined processor. The instruction set includes fixed length 32-bit reduced instruction set computer (RISC) type instructions that are tuned for DSP applications. Almost all instructions perform register-to-register operations, and all memory accesses are performed using explicit load/store instructions. As shown in FIG. 2, instruction pipeline 58 includes fetch stage 60 and decode stage 62. Fetch stage 60 retrieves program codes into the processor core from instruction cache 64 in groups of eight instructions called a fetch packet. Decode stage 62 parses the fetch packet, determines parallelism and resource availability, and constructs an execute packet of up to eight instructions. Each instruction in the execute packet is then translated into control signals to drive the appropriate units in execution pipeline 66. Execution pipeline 66 includes two symmetrical datapaths, datapath A 68 and datapath B 70, a common 64-bit load/store unit group, D-unit group 72, and a common branch unit group, P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66, of which eight may scheduled concurrently every cycle. Each functional unit group contains plural functional units, some of which are duplicated between unit groups. In total there are nine 32-bit adders, four 32-bit shifters, three Boolean operators, and two 32×16 multipliers. The multipliers are each configurable into two 16×16 or four 8×8 multipliers.

FIG. 3 is a chart summarizing the resource availability and register accessibility for all of the functional unit groups in execution pipeline 66. Upon receiving control signals from decode stage 62, source operands are read from register file(s) 76 and sent to the execution unit groups. A summary of the types of operations performed by each unit group are listed in the Operations column in FIG. 3. The unit groups' access to the two register files in DSP core 44 is summarized in the Register File Access column in FIG. 3. Each datapath-specific unit group has direct read-access to its own register file (primary datapath), and may also read the other register file (alternative datapath) via read-only crosspath 86, shown in FIG. 2. The execution unit groups then carry out the operations and write back the results into their respective register file. There is no write access to the other datapath's register file for the datapath-specific unit groups. D-unit group 72 performs address computation, and has read/write access to both register files 76 and interfaces with data cache/random access memory (RAM) 88 via a 32-bit address bus and 64-bit data bus. P-unit group 74 handles branching and other program control flow, and has read access to both register files 76.

DSP core 44 of FIG. 2 comprises a deep pipeline with minimal hardware logic control, thus facilitating high clock speeds and high data throughput, and providing a high degree of instruction execution control at the programming level. The DSP hardware does not manage data dependencies (e.g., read-before-write, write collision, etc.), therefore it is the compiler's or assembler's responsibility to take delay-slot requirements into account in instruction scheduling.

Figure 4:
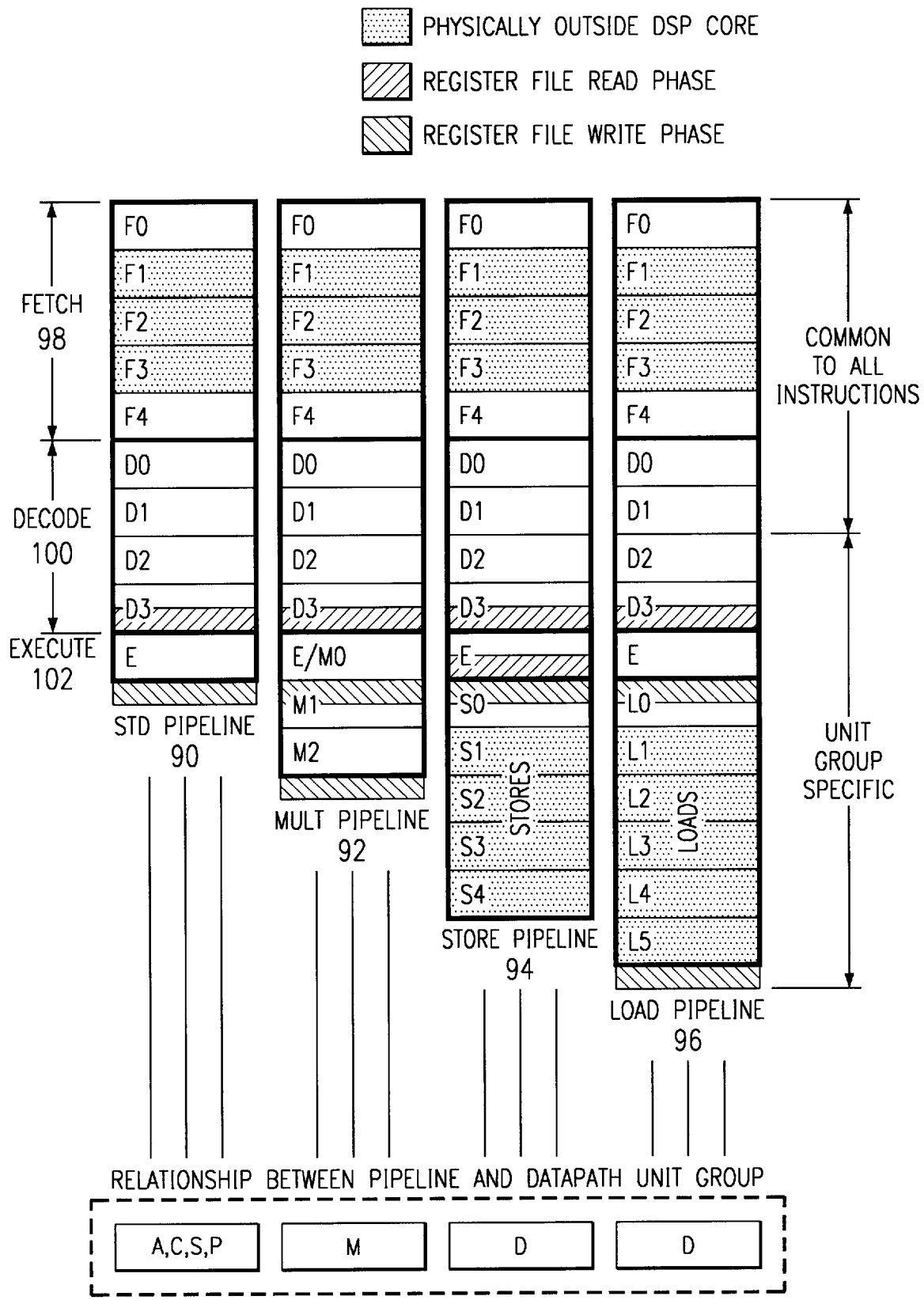
FIG. 4 is a chart of the DSP pipeline depth of the DSP core within the DSP cluster of FIG. 2.

FIG. 4 illustrates the four pipeline types utilized by DSP core 44: standard pipeline 90, used by the A-, C-, S-, and P-unit groups; multiply pipeline 92, used by the M-unit group; store pipeline 94, used by the D-unit group; and load pipeline 96, also used by the D-unit group. The pipeline depth varies from ten stages for standard pipeline 90, to thirteen stages for multiply pipeline 92, to fifteen stages for store pipeline 94, and up to sixteen stages for load pipeline 96. An operation advancing down the pipeline advances one stage every CPU cycle, which refers to the period during which an execute packet occupies any given execute stage. A CPU cycle equates to a clock cycle when there are no stalls. Conceptually, the DSP pipeline may be partitioned into two main pipelines, the instruction pipeline and the execution pipeline. The instruction pipeline is common to all instructions and includes the five-stage instruction fetch function 98, and the four-stage decode/dispatch function 100. The depth and functionality of execution pipeline 102 is instruction dependent. For example, non-multiply operations performed in the M-unit group do not require the deep pipeline necessary for multiply operations, so the results of these operations are available for write-back in stage M1. Similarly, the results of address math operations performed in the D-unit group are written to the register file at the end of stage E. Thus, even though these example instructions are performed by the M- and D-unit groups, respectively, their pipelines appear to be that of the standard pipeline.

Figure 5:
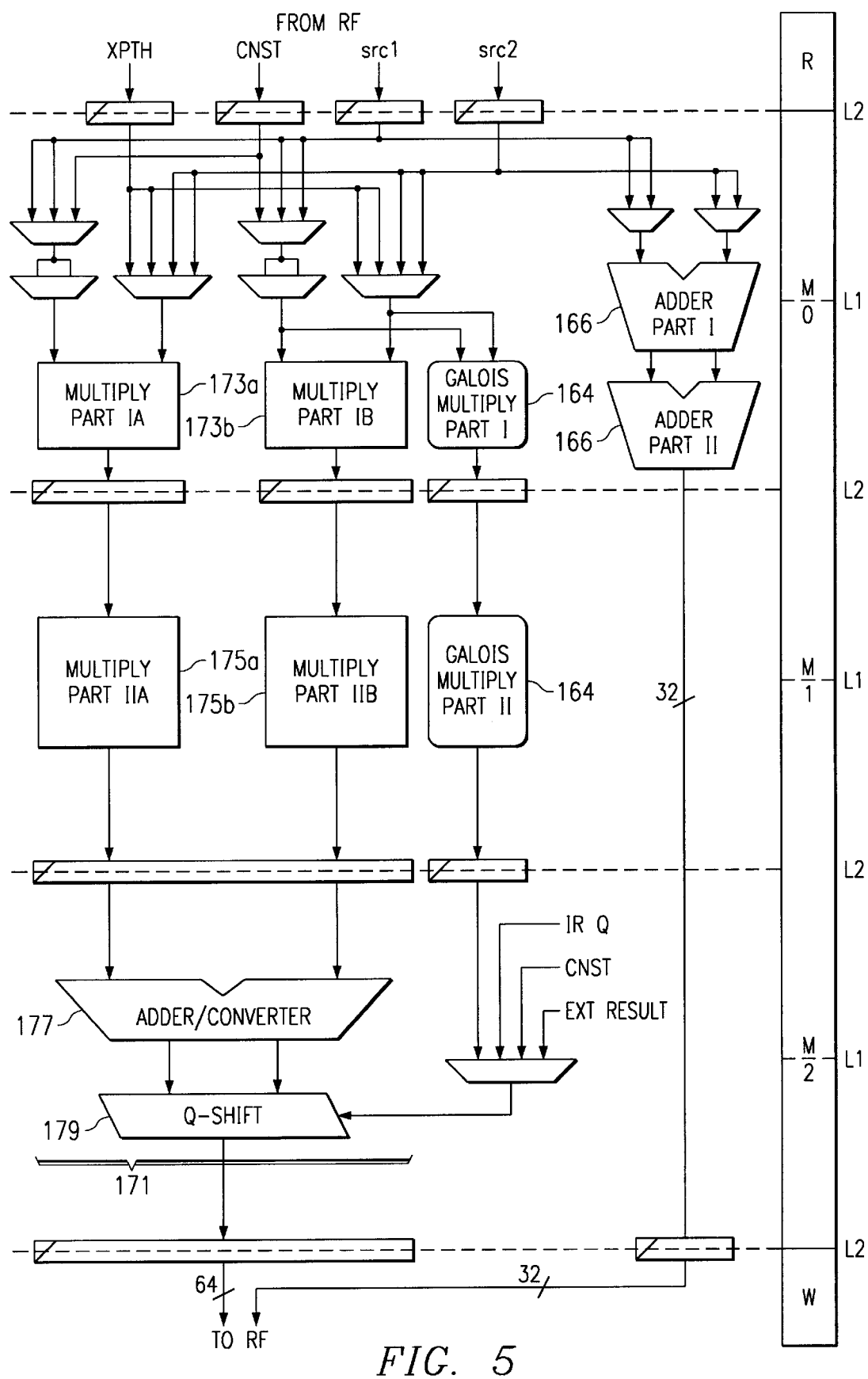
FIG. 5 is a top level block diagram of an M unit group in the processor, which is optimized to handle multiplication.

FIG. 5 is a top level block diagram of M unit group 84, which is optimized to handle multiplication, although hardware is available for a limited set of add and subtract operations. M unit group 84 has three major functional units: M Galois multiply unit 164, M adder unit 166 and M multiply: unit 171. While M adder unit 166 can complete its operations within the Execute cycle, the other two units require two additional cycles to complete the multiply operations. In general, M multiply unit 171 can perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 173, which provide the inputs for Multiply Parts IIA & B 175, followed by the final stage which contains Adder/Converter 177 and quotient shifter (Q-shift) 179.

M Galois multiply unit 164 performs Galois multiply in parallel with M multiply unit 171. For output from M unit group 84, the Galois multiply result is muxed with the M multiply result. Details of the Galois multiply unit are provided in co-assigned U.S. patent application Ser. No. 09/507,187 to David Hoyle entitled Galois Field Multiply and is incorporated herein by reference.

M adder unit 166 is only lightly coupled to the other units in M unit group 84: it shares read port, but has a dedicated write port, making it possible for both a multiply and an add instruction to write results in the same cycle from M unit group 84.

FIG. 6 is a chart of the basic assembly format for DSP core 44 instructions, along with examples for each functional unit group. The '||' notation is used in optimized/scheduled assembly to indicate that an instruction is scheduled in the same execute packet with the preceding instruction(s). For example, in the instruction sequence contained in Table 1, instructions (1) through (6) are scheduled in the same execute packet, and should execute simultaneously, although all six instructions will not complete at the same time.

TABLE 1

Example of Parallel Instruction Sequence

| | |
|---|---|
| ADD .A1 A1,A2,A3 | ;(1) |
| \|\| SUB .C1 A4,A5,A6 | ;(2) |
| \|\| SHL .S1 A7,A8,A9 | ;(3) |
| \|\| MPY .M1 A10,A11,A12 | ;(4) |
| \|\| ADD .A2 B1,B2,B3 | ;(5) |
| \|\| MPY .M2 B4,B5,B6 | ;(6) Instructions (1), (2), (3), (4), (5), and (6) may be scheduled in the same execute packet |
| SUB .A2 B3,B2,B1 | (7) Instruction (7) must be scheduled in the next execute packet because it reuses unit group A2 |

All instructions can be predicated (conditionally executed) on the value of a predication register. Assembly examples using the [predication reg] notation follow:

| | | |
|---|---|---|
| [A0] | ADD .A1 A1,A2,A3 | ;execute the ADD instruction ;if A0 is non-zero |
| [!A0] | ADD .C2 B7,B8,B9 | ;execute the ADD instruction ;if A0 is zero |

Because several instructions such as ADD or SUB are available in more than one unit group, the '.unit' notation is recommended when the programmer specifically wants to direct an instruction to a particular unit group. If the '.unit' notation is omitted, the compiler or assembler will automatically assign instructions to appropriate unit groups. Load, store and address instructions are only available in D-unit group 72, therefore the .D specification is redundant and optional. For the same reason, the .P specification is redundant for branch instructions in P-unit group 74.

The 'datapath' notation is also redundant and optional because the destination register implicitly specifies the datapath (note that for store instructions, the source register specifies the datapath). The 'crosspath' notation is used to indicate that one of the source operands (generally, op1 for the shift and bit-field instructions, op2 for all others; unary instructions may also use the crosspath on their operand) comes from the other datapath's register file via the crosspath.

Figure 7:
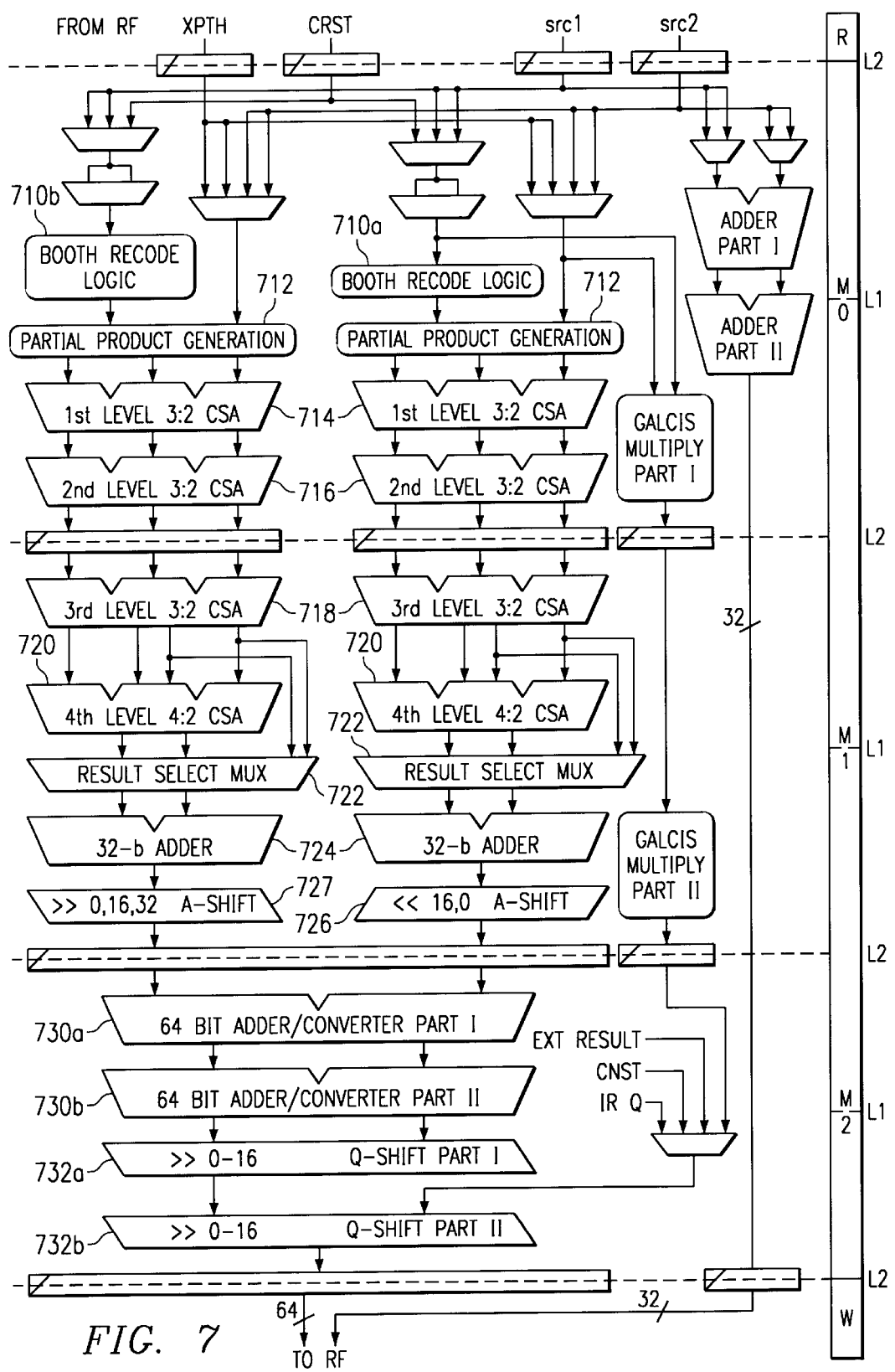
FIG. 7 is a more detailed block diagram of the multiplier unit of FIG. 5.

FIG. 7 is a more detailed block diagram of the multiplier unit of FIG. 5, and will be described in more detail with reference to FIGS. 8–18.

Figure 8:
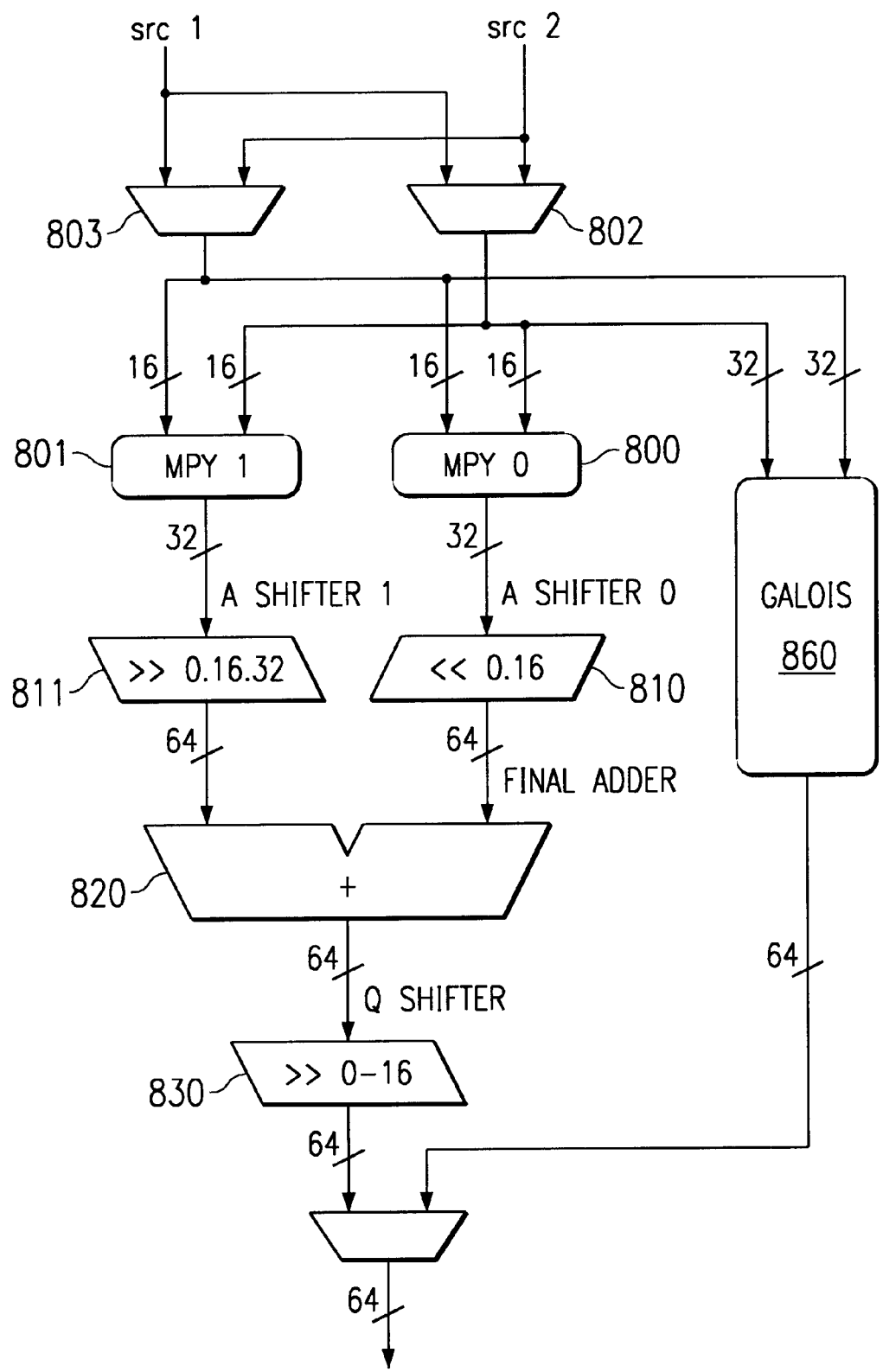
FIG. 8 is a functional diagram of the multiplier of FIG. 7.

FIG. 8 is a functional diagram of the multiplier of FIG. 7. The M unit includes a pair of 16 by 16 multipliers mpy0, mpy1 and auxiliary hardware to enable a large number of multiply. functions. M unit receives two register inputs (src1 and src2) and generates a 64 bit output to an even/odd pair of registers. Each multiplier receives two 16 bit inputs. These may be independently selected as the upper/lower 16 bits of the 32 bit data word recalled from the src1 and src2 operand registers. Each multiplier uses part of src1 and part of src2. The part used (upper/lower 16 bits) is independently selectable via op code. Each multiplier has a size input enabling selection of a single 16 by 16 bit multiply or a pair of 8 by 8 bit multiplies.

Referring still to FIG. 8, multiplier 800 and A shifter 810 together correspond to multiplier 173*b*, 175*b* of FIG. 5. Likewise, multiplier 801 and, shifter 811. correspond to multiplier [173]*a*, 175***a* of FIG. 5. Final adder 820 corresponds to adder 177 of FIG. 5. Q shifter 830 corresponds to Q-shift 179 of FIG. 5. Galois field multiplier 860 corresponds to Galois field multiplier 164 of FIG. 5.

Figure 9:
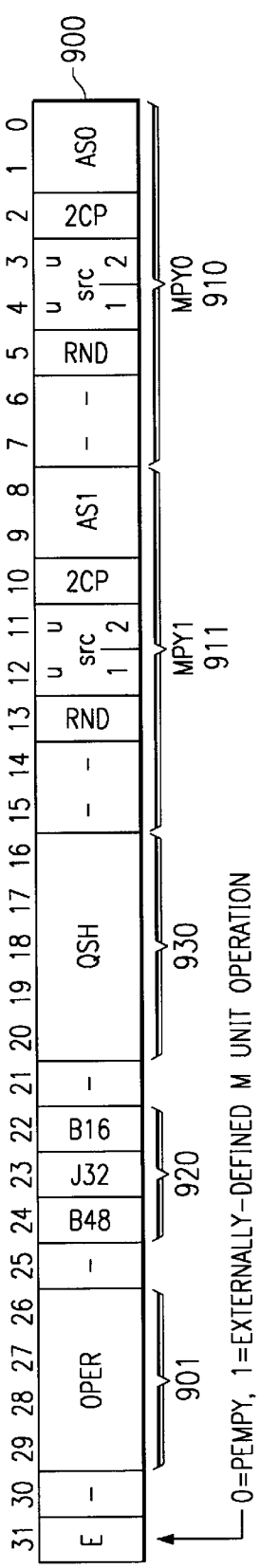
FIG. 9 illustrates an EMPY register for controlling the functional blocks of the multiplier of FIG. 8.

FIG. 9 illustrates an extended multiply (EMPY) control register 900 for controlling the functional blocks of the multiplier of FIG. 8. In this embodiment, any of registers A16–31 or B16–31 can be an EMPY register as the EMPY register is specified within the instruction code for Packed Extended Multiply (PEMPYxx) instructions, as described in more detail later. The selected EMPY register must be loaded prior to executing an associated PEMPYxx instruction.

Operation field 901 specifies the basic operation of paired multipliers 800, 801. MPY0 control field 910 controls the operation of multiplier 800–810 by specifying the operation of A shift unit 810 via the AS0 field, rounding via the RND field, signed/unsigned via the "u" bit fields, and 2s complimentation of src1 operand via the 2CP field. Similarly, MPY1 control field 911 controls the operation of multiplier 801–811. The operation of final adder/converter 820 is controlled by field 920. The operation of Q shifter 830 is controlled by QSH field 930.

Advantageously, paired multipliers 800, 801 can be configured to perform: two 16×16 multiply or four 8×8 multiply with all combination of signed/unsigned numbers, Q-shifting and A-shifting of multiply results, support rounding for EMPY instructions, control the carry chain by breaking/joining the carry chain at 16-bit block boundary, and support saturation multiply where the final result is shifted left by 1 or return 0x7FFHTFF if overflow occurred.

A set of packed data extended multiply instructions (PEMPYxx) instructions allow direct control over various pieces of the multiplier's control logic, allowing a large combination of multiplies, shifts and adds. All of the PEMPYxx instructions send the low half-word of the source operand 1, referred to herein as src1 and op1, to the multiplier's mpy0 unit. Similarly, all of the PEMPYxx instructions send the high half-word of source operand op1 to the multiplier's mpy1 unit. The various PEMPYxx instructions direct portions of the second source operand, referred to as src2 or xop2, to the mpy0 and mp1 units, as shown in Table 2. The PEMPYxx instructions produce 64-bit results which are written to odd/even register pairs.

TABLE 2

PEMPYxx Instructions

| | |
|---|---|
| PEMPYHH | sends xop2's high half word to both mpy0 and mpy1. |
| PEMPYHL | sends xop2's high half word to mpy1 and sends xop2's low half word to mpy0. |
| PEMPYLH | sends xop2's low half word to mpy1 and sends xop2's high half word to mpy0. |
| PEMPYLL | sends xop2's low half word to both mpy0 and mpy1. |

FIG. 10 illustrates the EMPY control register of FIG. 9 configured for a Galois field multiplication in response to any PEMPYxx instruction. Galois multiplier 860 uses a polynomial provided in polynomial field 1010 and operates on a field size specified by size field 1020.

FIGS. 11A, 11B, 11C, 11D, 11E, 11F, 11G, 11H, and 11I are flow charts illustrating various multiply operations that can be performed by the paired multiply units of FIG. 7–8.

FIG. 11A illustrates a pair of 16-bit by 16-bit (halfword) multiplies. There are four combinations of src1, src2 possible, corresponding to the set of four PEMPYxx instructions (see Table 2).

FIG. 11B illustrates a pair of 16-bit by 16-bit (halfword) multiplies with addition of the two products, making use of a PEMPYHL instruction with appropriate set-up in the EMPY register.

FIG. 11C illustrates a complex number multiplication of the real part, also using a PEMPYHL instruction, but with a different set-up in the EMPY register.

FIG. 11D illustrates complex number multiplication of the imaginary part, making use of a PEMPYLH instruction with an appropriate set-up in the EMPY register.

FIG. 11E illustrates a first portion of a 32-bit multiplication while FIG. 11F illustrates a second portion of the 32-bit multiplication. These two results may then be summed in a 64-bit sum to form a 64-bit resultant of a complete 32-bit by 32-bit multiply. For the first portion, a PEMPYHL instruction is used, while for the second portion a PEMPYLL instruction is used and the first and second source operands are reversed.

FIG. 11G illustrates a quad 8-bit by 8-bit multiplication that produces A*E, B*F, C*G, and D*H. This produces four independent products for two operands with packed data using the PEMPHL instruction with the EMPY register set-up to configure the multiply units as four individual 8×8 bit multipliers.

FIG. 11H illustrates a first variation of a quad 8-bit by 8-bit multiplication with accumulation into two sums that produces A*E+C*G and B*F+D*H. These two separate 32-bit sums (actually 17 bits) can be added as normal 32 bit quantities. This example again uses the PEMPHL instruction with the EMPY set-up to configure final adder 820 as two separate adders.

Figures 11I, 12:
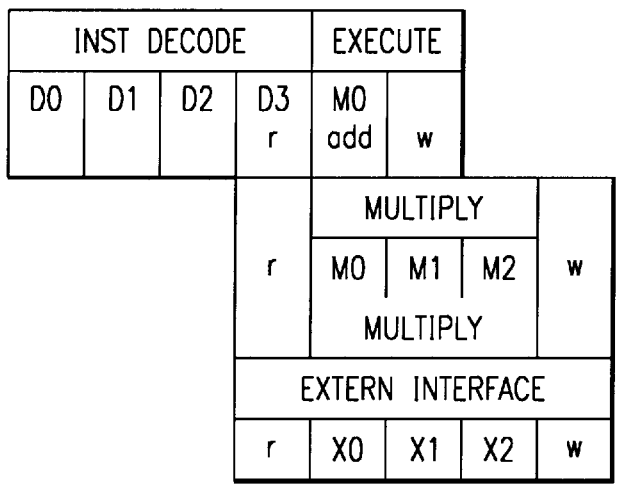

FIG. 11I illustrates a second variation of a quad 8-bit by 8-bit multiplication with accumulation into two sums that produces A*E+B*F and C*G+D*H. These two separate 32 bit (actually 17 bit) sums may be added as normal 32 bit quantities. The first variation allows multiply/accumulate of a number of first operands with a single second operand (as in 16 bit word length multiply/accumulate of a number of variables with a single packed constant. This example again uses the PEMPHL instruction with the EMPY set-up to configure final adder 820 as two separate adders.

The operation of paired multipliers 800, 801 will now be described in more detail. Referring again to FIG. 7, there are three sub-units in the M unit. The adder executes add/subtract instructions; the Galois multiply operations of the four PEMPYxx instructions are executed in the Galois multiplier and the other instructions are executed by the main multiplier.

FIG. 12 is a timing diagram illustrating operation of the instruction pipeline of the DSP while executing multiply instructions, and comports with FIG. 4. Instructions using the main multiplier take four cycles from the operand register reads to the register writes of the results, as illustrated in FIG. 12. Instruction acquisition and decoding is performed in instruction pipeline stages D0–D2. During Cycle D3-Phase 2, instruction operands are read from the Register File. All operands are 32-bit wide. The M unit's instructions can get operands from the following sources:

Source 1: any of 0–31 register locations; dedicated register file read port number 6; or 5 bit signed constant specified in the OPCODE.

Source 2: any of 0–31 register locations; dedicated register file read port number 7; or cross-over dedicated register file read port.

EMPY_Reg: any of 16–31 register locations; or shared read port 4 with S unit, only used for PEMPYxx instructions.

Src1 and Src2 operands are piped down to the input multiplexers. EMPY_Reg go through EMPY decode logic to generate controls for EMPY operations.

During Cycle M0-Phase 1, Input Multiplexers and Booth-Recode-Logic 710a,b (see FIG. 7) receive 32-bit data from Src1 and Src2 that is split into two separated 16-bit half-words, and selected appropriately from instruction decode controls, as illustrated in FIG. 13. Table 3 defines nine instruction groups that are decoded and executed by the paired multipliers.

TABLE 3

Multiplier unit Instruction Groups

Group 1  MPY, MPYSU
Group 2  MPYSUS, MPYU, MPYU8, MPYUS, SMPY
Group 3  SMPYH

TABLE 3-continued

Multiplier unit Instruction Groups

Group 4  SMPYHL
Group 5  SMPYLH
Group 6  PEMPYHL, PMPY, PMPYH32, PMPYSU, PMPYU, PMFYUS, PSMPY
Group 7  PEMPYLH, PMPYLH, PMPYLHSU, PMPYLHU, PMPYLHUS, MPLYLSU32, PSMPYLH
Group 8  PEMPYLL
Group 9  PEMPYHH Src1 will become the multiplier and Src2 will become the multiplicand. In order to support 2 8×8 as well as 1 16×16 multiply, the multipliers are broken down again to two 8-bit busses and sign-extended. Booth-Recode-Logic 710a,b then generates mux selects for partial products. The Booth-Recode-Logic must also be able to invert the recoding of src1 for (−A)×B multiplication. In parallel, the multiplicand also are broken down to two 8-bit busses to support 2 8×8, and multiples of 1×, 2×, −1×, and −2× are generated, as listed in Table 4.

TABLE 4

Radix-4 Booth Recode Truth Table

| Negate | Bitn+1 | Bitn | Bitn−1 | Multiple |
|---|---|---|---|---|
| 0 | 0 | 0 | 0 | 0 |
| 0 | 0 | 0 | 1 | +1 |
| 0 | 0 | 1 | 0 | +1 |
| 0 | 0 | 1 | 1 | +2 |
| 0 | 1 | 0 | 0 | −2 |
| 0 | 1 | 0 | 1 | −1 |
| 0 | 1 | 1 | 0 | −1 |
| 0 | 1 | 1 | 1 | 0 |
| 1 | 0 | 0 | 0 | 0 |
| 1 | 0 | 0 | 1 | −1 |
| 1 | 0 | 1 | 0 | −1 |
| 1 | 0 | 1 | 1 | −2 |
| 1 | 1 | 0 | 0 | +2 |
| 1 | 1 | 0 | 1 | +1 |
| 1 | 1 | 1 | 0 | +1 |
| 1 | 1 | 1 | 1 | 0 |

Figure 14:
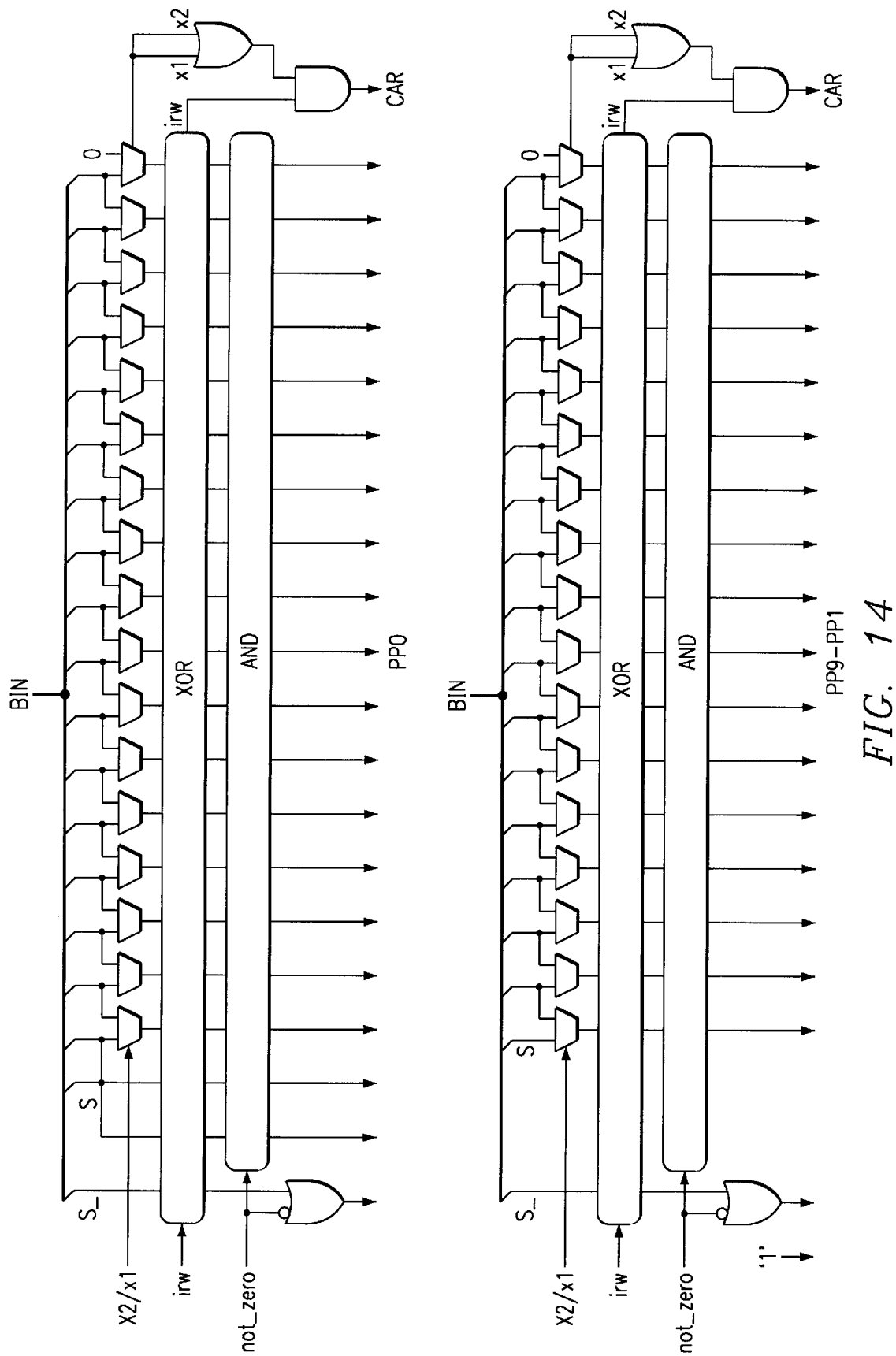
FIG. 14 is a block diagram of the partial products generator of FIG. 7.

FIG. 14 is a block diagram of the partial products generator of FIG. 7. During Cycle M0 Phase 2, partial product generation is performed in partial product circuitry 712 and forwarded to first and second levels 3:2 CSA 714, 716. Since both signed and unsigned 2~8×8 or 1 16×16 multiply is supported, there is provided a total of ten partial products. Each partial product can have value of 0, 1×, 2×, ^1×, ^2× and is sign-extended appropripriatly. The partial products are selected in this phase by the controls generated from the Booth-Recoding-Logic. If none of the selects signals are asserted, then the partial products will all be zero.

Figure 15:
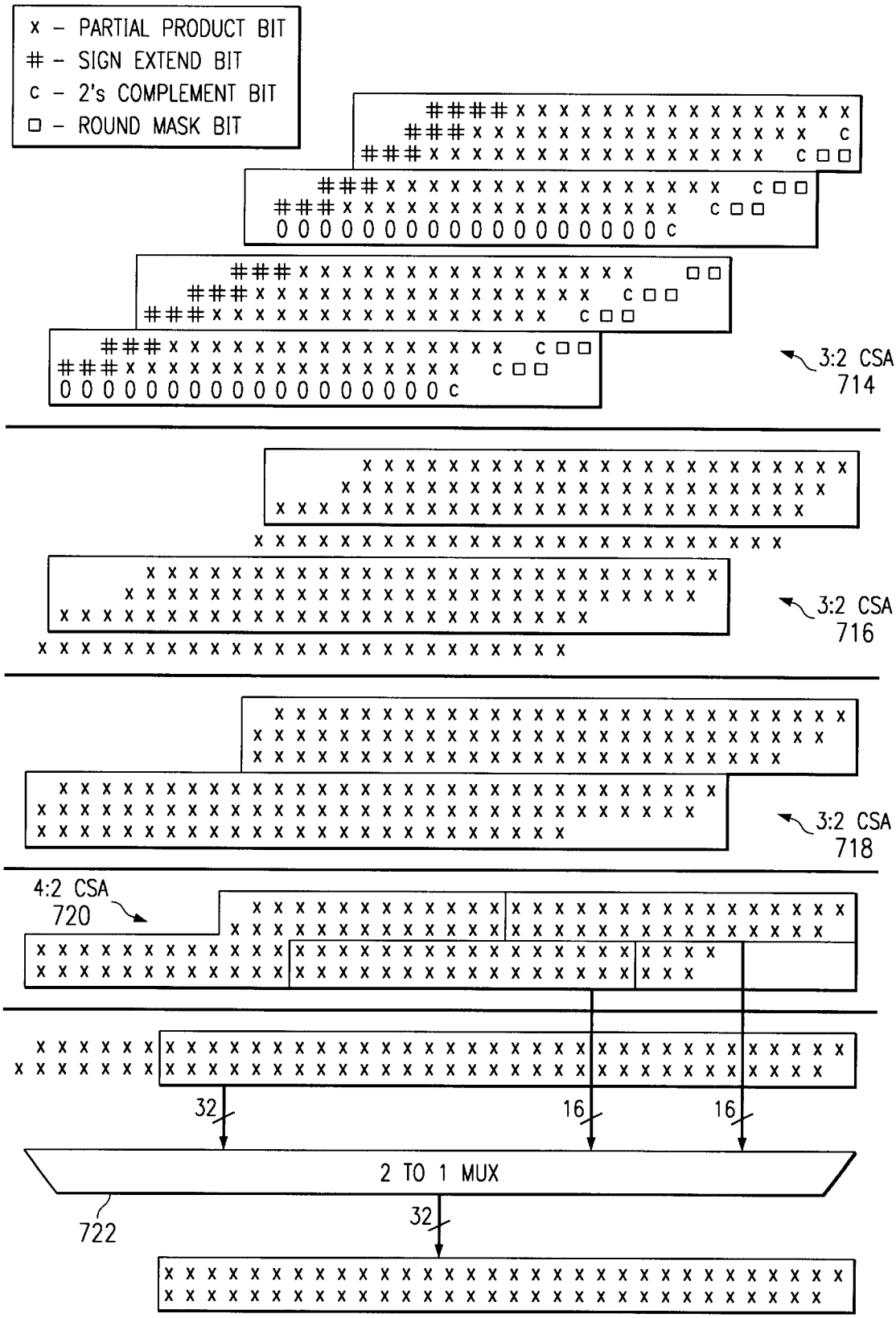
FIG. 15 illustrates compression units of the multiplier of FIG. 7 in more detail.

FIG. 15 illustrates CSA compression units of the multiplier of FIG. 7 in more detail. First level 3:2 CSA 714 will compress partial product PP0, PP1, PP2 and PP5, PP6, PP7 down for 2nd level CSA 716. PP3, PP4, PP8, PP9 are compressed in 2nd level CSA 716. Table 5 defines the operation of the CSA structures.

TABLE 5

CSA Truth Table

| Bitn+1 | Bitn | Bitn−1 | Carry | Sum |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

During cycle M1 Phase 1, the compressed partial products are forwarded to third level 3:2 CSA 718 and fourth level 4:2 CSA 720. The partial products are compressed again using 3:2 CSA 718. After this level, there are four partial products left. For two 8×8 multiply, the first two partial products are results of the first 8×8 while the last two partial products are results of the second 8×8. For one 16×16 multiply, these four partial products are compressed again in fourth level 4:2 CSA 720. 4:2 CSA 720 compresses the final partial products for a 16×16 multiply down to final Carry-Sum pairs. Result select multiplexor 722 then select between these Carry-Sum pairs and the Carry-Sum pairs generated for 2 8×8 multiply. FIG. 16 illustrates one unit of 4:2 CSA 720 in more detail, showing that it is equivalent two 3:2 CSA units. 32-bit adders 724 receive the output of multiplexors 722 and provide sums to A-shifters 726,727.

FIG. 17 illustrates operation of A-shift circuitry 726, 727 during Cycle M1 Phase 2. The A-shifters of MPY0 and MPYI are architecturally different from each other. MPY0 A-shifter performs a left shift by amounts of 0, and 16; while MPY1 A-shifter performs a right shift by 0, 16, and 32. Also, each 16-bit half-word can be shifted independently within the A-shifter. Depending on the operation, the shifted data may be sign-extended appropriately. After the A-shift, the two pairs of Carry-sum from MPY0 and MPY1 are added together in a final 4:2 CSA 730a,b. Since the final results can be four independent 16-bit numbers, the carry propagate from each 16-bit half-word boundaries must be controlled.

Figure 18:
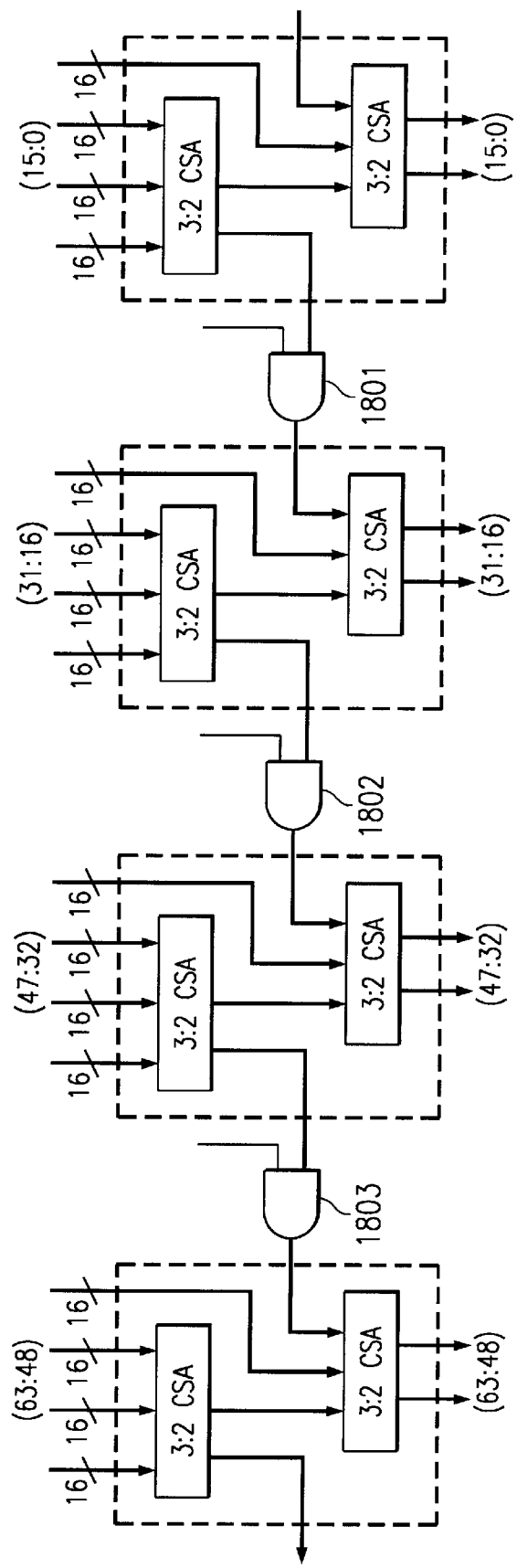
FIG. 18 is a more detailed block diagram of the 64-bit adder of FIG. 7.

FIG. 18 is a more detailed block diagram of 64-bit adder/converter 730a,b. The last four logic levels 730b of the 64 bit adder/converter are computed during Cycle M2 Phase 1. The 64 bit adder/converter perform the final addition. The carries between each 16-bit haft-word boundaries also are controlled to get the proper result using gates 1801–1803 in response to control signals derived from the instruction being executed and the contents of the EMPY register.

Q-shifter 732a,b is an arithmetic right shifter which can shift between 0–16 bits inclusive during Cycle M2 Phase 2. The shifted numbers are sign extended appropriately. The Q-shifter is divided into two levels of multiplexors. The first level 732a is a 6:1 multiplexor, which allow shifting of −1,0,1,2,3. The second level 732b is 7:1 multiplexor, which allow shifting of 0,5,10,15 and multiplexing of External/Galois results.

Table 6 provides a more detailed description of the various signed and unsigned multiply instructions included in the instruction groups listed in Table 3. Table 7 provides a more detailed description of a set of packed multiply instructions that are capable of operating on packed data using the versatile multipliers of FIG. 5. Appendix A provides a detailed pseudo code execution step sequence of the set of extended multiply instructions listed in Table 2 which are executed by the multipliers of FIG. 5.

TABLE 6

Signed and Unsigned Multiply Instructions

MPY

Gets the lower 16-bits of op1 and the lower 16-bits of xop2 as signed operands and performs a signed multiplication to produce a 32-bit signed result. The 5-bit constant in the constant form is sign-extended before the multiply.

MPYSU

Gets the lower 16-bits of op1 as a signed operand and the lower 16-bits of xop2 as an unsigned operand and performs a signed multiplication to produce a 32-bit signed result. The 5-bit constant in the constant form is sign-extended before the multiply.

MPYU

Gets the lower 16-bits of op1 and the lower 16-bits of xop2 as unsigned operands and performs an unsigned multiplication to produce a 32-bit signed result.

MPYUS

Gets the lower 16-bits of op1 as an unsigned operand and the lower 16-bits of xop2 as a signed operand and performs a signed multiplication to produce a 32-bit signed result.

SMPY

Gets the lower 16-bits of op1 and the lower 16-bits of xop2 as signed operands and performs a signed multiplication to produce a 32-bit signed result. The 32-bit result is left shifted by one. If the left shifted result is 0x80000000, then the result is saturated to Ox7FFFFFFF. If a saturate occurs, the SAT bit in the ASR is set in the same cycle that the destination registers are written.

SMPYH

Gets the higher 16-bits of op1 and the higher 16-bits of xop2 as signed operands and performs a signed multiplication to produce a 32-bit signed result The 32-bit result is left shifted by one If the left shifted result is 0x80000000, then the result is saturated to 0xFFFFFFFF. If a saturate occurs, the SAT bit in the ASR is set in the same cycle that the destination registers are written.

SMPYHL

Gets the higher 16-bits of op1 and the lower 16-bits of xop2 as signed operands and performs a signed multiplication to produce a 32-bit signed result. The 32-bit result is left shifted by one. If the left shifted result is 0x80000000, then the result is saturated to 0x7FFFFFFF. If a saturate occurs, the SAT bit in the ASR is set in the same cycle that the destination registers are written.

SMPYLH

Gets the lower 16-bits of op1 and the higher 16-bits of xop2 as signed operands and performs a signed multiplication to produce a 32-bit signed result. The 32-bit result is left shifted by one. If the left shifted result is 0x80000000, then the result is saturated to 0x7FFFFFFF. If a saturate occurs, the SAT bit in the ASR is set in the same cycle that the destination registers are written.

TABLE 7

Packed Data Multiply Instructions

PMPY

Performs signed multiplication on the packed signed half-word operands from op1 and xop2. The low half-words of the two operands are multiplied together, as are the high half-words. The two 32-bit results are written to an odd/even register pair in the register file. The 32-bit result from the lower half-word operands is stored in the even-numbered register of the pair; the 32-bit result from the higher half-word operands is stored in the odd-numbered register of the pair.

PMPYH32

Multiplies the signed word in op1 by the signed high half-word of xop2, producing a 48-bit intermediate result which is then shifted left by 16-bits

TABLE 7-continued

Packed Data Multiply Instructions before being written to an odd/even register pair. The even result register will contain the low word of the result, and the odd result register will contain the most significant word of the result. The 64-bit result is identical to the value produced by multiplying two signed 32-bit numbers together in which one of the operands has zeros in the low half-word. The PMPYH32 instruction is intended to be used in conjunction with the PMPYLSU32 instruction to perform 32-bit signed multiplication.
PMPYLH Performs signed multiplication on the packed signed half-words from op1 and xop2. The low half-word of op1 is multiplied with the high half-word of xop2 and vice versa. The two 32-bit results are written to an odd/even register pair in the register file. The 32-bit result of the multiplication of opt low by xop2 high is stored in the even-numbered register of the pair; the 32-bit result of the multiplication of op1 high by xop2 low is stored in the even-numbered register of the pair.
PMPYLHSU Performs signed multiplication on the signed half-words from op1 with the unsigned half-words from xop2. The low half-word of op1 is multiplied with the high half-word of xop2 and vice versa. The two 32-bit results are written to an odd/even register pair in the register file. The 32-bit result of the multiplication of op1 low by xop2 high is stored in the even-numbered register of the pair; the 32-bit result of the multiplication of op1 high by xop2 low is stored in the even-numbered register of the pair.
PMPYLHU Performs unsigned multiplication on the unsigned half-words from op1 with the unsigned half-words from xop2 and vice versa. The two 32-bit re-
sults are written to an odd/even register pair in the register file. The 32-bit result of the multiplication of op1 low by xop2 high is stored in the even-numbered register of the pair; the 32-bit result of the multiplication of op1 high by xop2 low is stored in the even-numbered register of the pair.
PMPYLHUS Performs signed multiplication on the unsigned half-words from op1 with the signed half-words from xop2 and vice versa. The two 32-bit results are written to an odd/even register pair in the register file. The 32-bit result of the multiplication of op1 low by xop2 high is stored in the even-numbered register of the pair; the 32-bit result of the multiplication of op1 high by xop2 low is stored in the even-numbered register of the pair.
PMPYLSU32

Multiplies the signed word in op1 by the unsigned low half-word of xop2, producing a 48-bit result which is written to an odd/even register pair. The even result register will contain the low word of the result, and the odd result register will contain the most significant half-word of the result. The odd result register is sign-extended to 32-bits. The PMPYLSU32 instruction may be used in conjunction with the PMPYH32 instruction to perform 32-bit signed multiplication.
PMPYSU Performs signed multiplication on the packed signed half-word operands from op1 and the unsigned half-word operands from xop2. The low half-words of the two operands are multiplied together, as are the high half-words. The 32-bit result from the lower half-word operands is stored in the even-numbered register of the pair; the 32-bit result from the higher half-word operands is stored in the odd-numbered register of the pair.
PMPYSU8

Multiplies the respective bytes of op1 as signed operands with the bytes of xop2 as unsigned operands to produce two separate 16-bit signed results
PMPYU Performs unsigned multiplication on the packed unsigned half-word operands from op1 and the unsigned half-word operands from xop2. The low half-words of the two operands are multiplied together, as are the high half-words The two 32-bit results are written to an odd/even register pair in the register file. The 32-bit result from the lower half-word operands is stored in the even-numbered register of the pair; the 32-bit result from the higher half-word operands is stored in the odd-numbered register of the pair.

TABLE 7-continued

Packed Data Multiply Instructions

PMPYU8

Multiplies the respective bytes of op1 with the bytes of xop2 to produce four separate 16-bit results. All operands and results are treated as unsigned numbers.
PMPYUS Performs signed multiplication on the packed unsigned half-word operands from op1 and the signed half-word operands from xop2. The low half-words of the two operands are multiplied together, as are the high half-words. The two 32-bit results are written to an odd/even register pair in the register file. The 32-bit result from the lower half-word operands is stored in the even-numbered register of the pair; the 32-bit result from the higher half-word operands is stored in the odd-numbered register of the pair.

Alternative Embodiment

Figure 19:
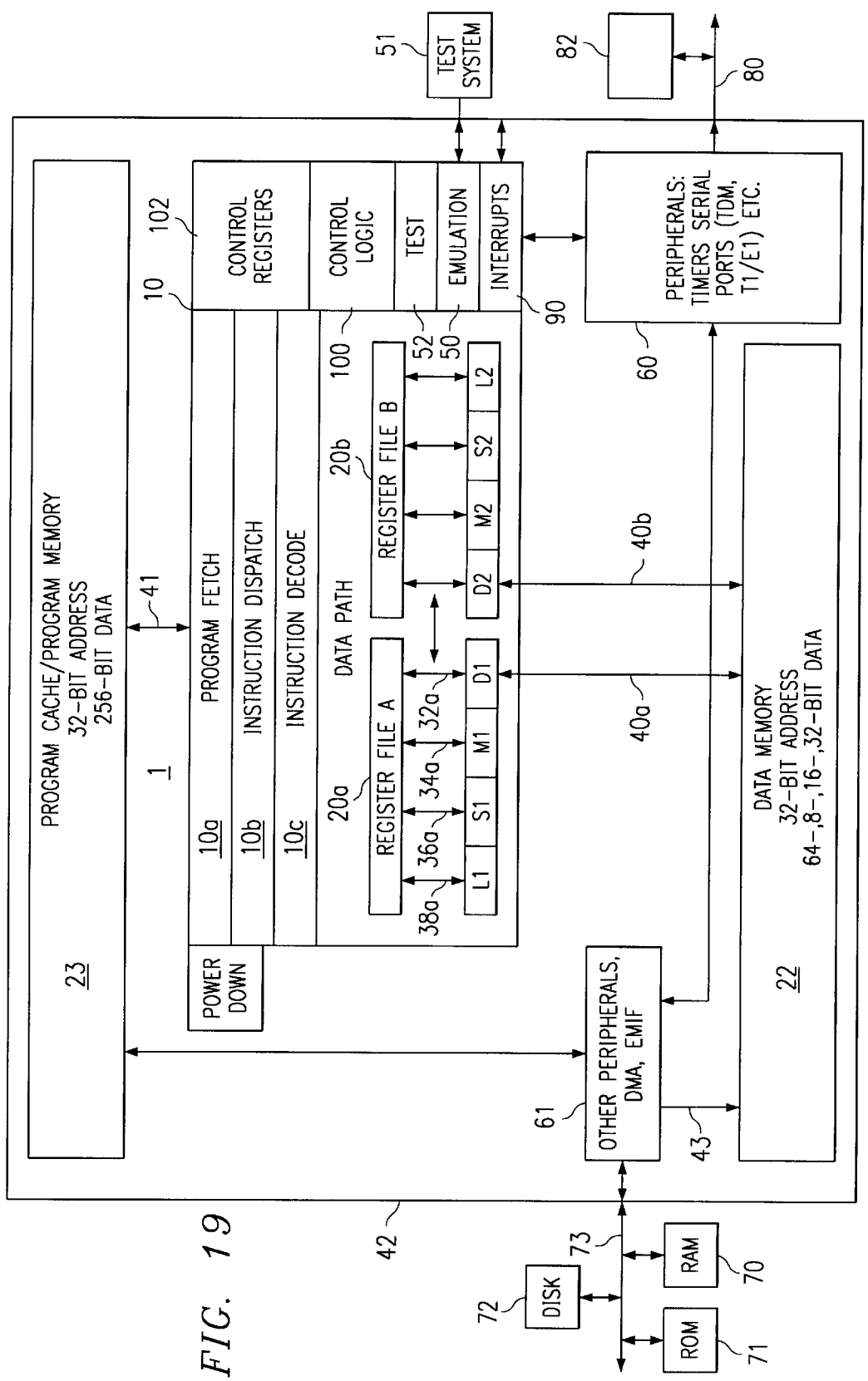
FIG. 19 is a block diagram of a digital system with a digital signal processor (DSP), showing components thereof pertinent to an alternative embodiment of the present invention.

FIG. 19 is a block diagram of a digital system with a digital signal processor (DSP), showing components thereof pertinent to an alternative embodiment of the present invention. In microprocessor 1 there are shown a central processing unit (CPU) 10, data memory 22, program memory/cache 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b. A single non-aligned double word load/store transfer is performed by scheduling a first .D unit resource and two load/store ports on a target memory. Advantageously, a second .D unit can perform 32-bit logical or arithmetic instructions in addition to the .S and .L units while the address port of the second .D unit is being used to transmit one of two contiguous addresses provided by the first .D unit.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 19 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 19. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals which are external to microprocessor 1.

A detailed description of various architectural features and a basic instruction set of the CPU 10 is provided in coassigned U.S. Pat. No. 6,182,203 and is incorporated herein by reference. A description of enhanced architectural features and an extended instruction set not described herein for CPU 10 is provided in coassigned application Ser. No. 09/703,096 and is incorporated herein by reference.

Figure 20:
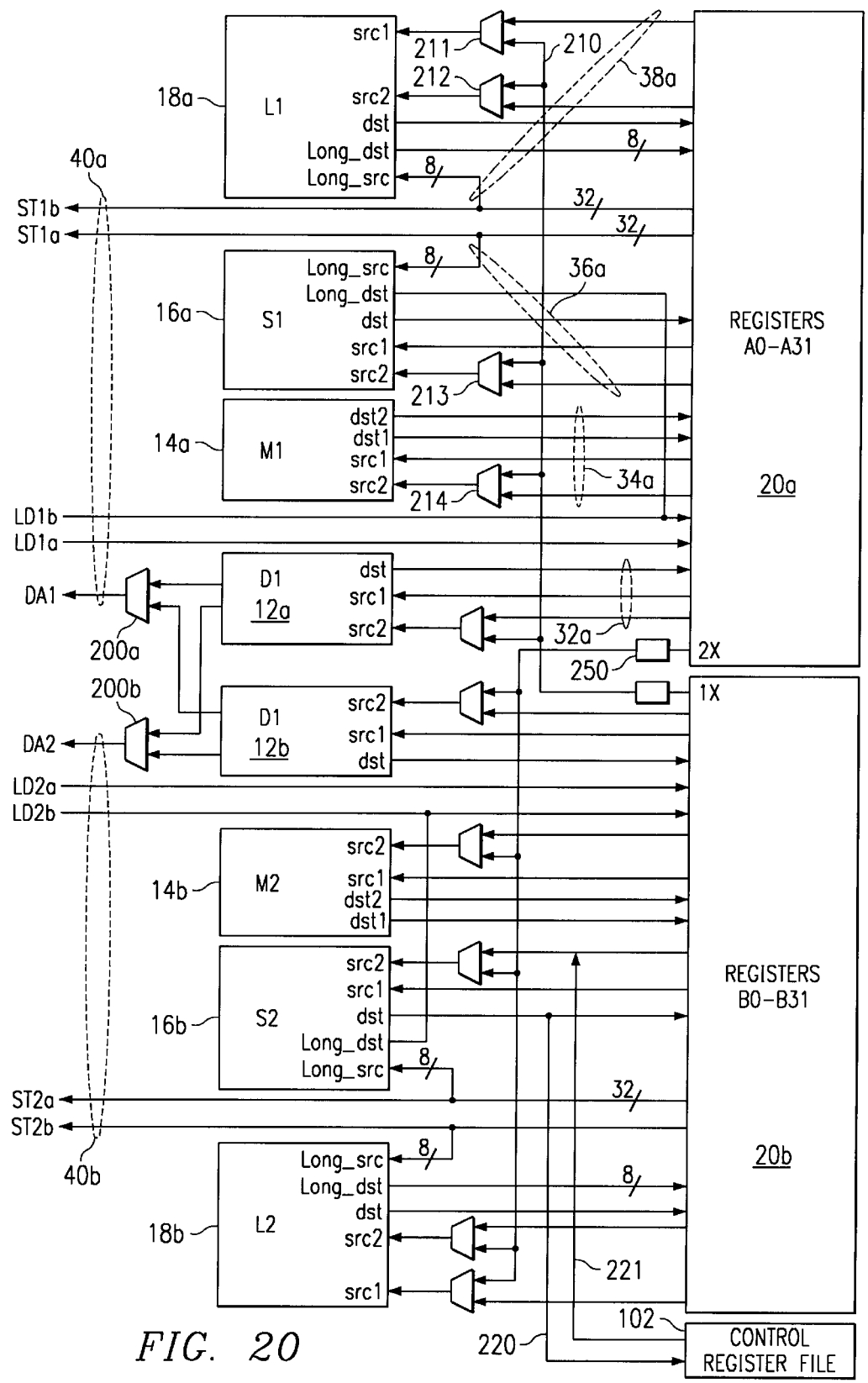
FIG. 20 is a block diagram of the functional units, data paths and register files of the DSP of FIG. 19.

FIG. 20 is a block diagram of the execution units and register files of the microprocessor of FIG. 19 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for file A and B0–B31 for file B). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 8. In assembly language syntax, a colon between the register names denotes the register pairs and the odd numbered register is specified first.

TABLE 8

40-Bit/64-Bit Register Pairs

| Register Files | |
|---|---|
| A | B |
| A1:A0 | B1:B0 |
| A3:A2 | B3:B2 |
| A5:A4 | B5:B4 |
| A7:A6 | 67:B6 |

TABLE 8-continued

40-Bit/64-Bit Register Pairs

| Register Files | |
|---|---|
| A | B |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

Referring again to FIG. 20, the eight functional units in processor 10's data paths can be divided into two groups of four; each functional unit in one data path is almost identical to the corresponding unit in the other data path. The functional units are described in Table 9.

Besides being able to perform 32-bit data manipulations, processor 10 also contains many 8-bit and 16-bit data instructions in the instruction set. For example, the MPYU4 instruction performs four 8×8 unsigned multiplies with a single instruction on an M unit. The ADD4 instruction performs four 8-bit additions with a single instruction on an L unit.

TABLE 9

Functional Units and Operations Performed

| Functional Unit | Fixed-Point Operations |
|---|---|
| .L unit (.L1, .L2), 18a,b | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, S2) 16a,b | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) 14a,b | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |

TABLE 9-continued

Functional Units and Operations Performed

| Functional Unit | Fixed-Point Operations |
|---|---|
| .D unit (.D1, .D2) 12a,b | 32-bit add, subtract, linear and circular address calculation<br>Loads and stores with 5-bit constant offset<br>Loads and stores with 15-bit constant offset (.D2 only)<br>Load and store double words with 5-bit constant<br>Load and store non-aligned words and double words<br>5-bit constant generation<br>32-bit logical operations |

Most data lines in the CPU support 32-bit operands, and some support long (40-bit) and double word (64-bit) operands. Each functional unit has its own 32-bit write port into a general-purpose register file 20a, 20b (Refer to FIG. 20). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port (long-dst) for 40-bit long writes, as well as an 8-bit input (long-src) for 40-bit long reads. Because each unit has its own 32-bit write port dst, when performing 32 bit operations all eight units can be used in parallel every cycle. Since each multiplier can return up to a 64-bit result, two write ports (dst1 and dst2) are provided from the multipliers to the register file.

Table 10 defines the mapping between instructions and functional units for a set of basic instructions included in the present embodiment. Table 11 defines a mapping between instructions and functional units for a set of extended instructions in an embodiment of the present invention. Alternative embodiments of the present invention may have different sets of instructions and functional unit mapping. Table 10 and Table 11 are illustrative and are not exhaustive or intended to limit various embodiments of the present invention.

TABLE 10

Instruction to Functional Unit Mapping of Basic Instructions

| .L Unit | .M Unit | .S Unit | .D Unit |
|---|---|---|---|
| ABS | MPY | ADD | ADD |
| ADD | SMPY | ADDK | ADDA |
| AND |  | ADD2 | LD mem |
| CMPEQ |  | AND | LD mem (15-bit offset) (D2 only) |
| CMPGT |  | B disp | MV |
| CMPGTU |  | B IRP | NEG |
| CMPLT |  | B NRP | ST mem |
| CMPLTU |  | B reg | ST mem (15-bit offset) (D2 only) |
| LMBD |  | CLR | SUB |
| MV |  | EXT | SUBA |
| NEG |  | EXTU | ZERO |
| NORM |  | MVC |  |
| NOT |  | MV |  |
| OR |  | MVK |  |
| SADD |  | MVKH |  |
| SAT |  | NEG |  |
| SSUB |  | NOT |  |
| SUB |  | OR |  |
| SUBC |  | SET |  |
| XOR |  | SHL |  |
| ZERO |  | SHR |  |
|  |  | SHRU |  |
|  |  | SSHL |  |

TABLE 10-continued

Instruction to Functional Unit Mapping of Basic Instructions

| .L Unit | .M Unit | .S Unit | .D Unit |
|---|---|---|---|
|  |  | STP (S2 only) |  |
|  |  | SUB |  |
|  |  | SUB2 |  |
|  |  | XOR |  |
|  |  | ZERO |  |

TABLE 11

Instruction to Functional Unit Mapping of Extended Instructions

| .L unit | .M unit | .S unit | .D unit |
|---|---|---|---|
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
|  | DOTPRSU2 | CMPGT2 |  |
|  | DOTPRUS2 | CMPGTU4 |  |
| MVK | DOTPSU4 | CMPLT2 | STNDW |
|  | DOTPUS4 |  |  |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 |  |
| PACKHL2 | MPYHIR | PACKH2 |  |
|  | MPYIH |  |  |
|  | MPYIHR |  |  |
| PACKL4 | MPYIL | PACKHL2 |  |
|  | MPYILR |  |  |
|  | MPYLI |  |  |
| PACKLH2 | MPYLIR | PACKLH2 |  |
| SHLMB | MPYSU4 | SADD2 |  |
|  | MPYUS4 |  |  |
| SHRMB | MPYU4 | SADDU4 |  |
| SUB2 | MVD | SADDSU2 |  |
|  |  | SADDUS2 |  |
| SUB4 | ROTL | SHLMB |  |
| SUBABS4 | SHFL | SHR2 |  |
| SWAP2 | SMPY2 | SHRMB |  |
| SWAP4 | SSHVL | SHRU2 |  |
| UNPKHU4 | SSHVR | SPACK2 |  |
| UNPKLU4 | XPND2 | SPACKU4 |  |
| XOR | XPND4 | SUB2 |  |
|  |  | SWAP2 |  |
|  |  | UNPKHU4 |  |
|  |  | UNPKLU4 |  |
|  |  | XOR |  |

Pipeline Operation

The instruction execution pipeline of DSP 1 has several key features which improve performance, decrease cost, and simplify programming, including: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses in memory 22 and program fetches in memory 23.

This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are described in Table 12.

TABLE 12

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions instructions are evaluated and operands read. Load and store instructions: address generation is computed and address modifications written to register file† Branch instructons: affects branch fetch packet in PG phase† Single-cycle instructions: results are written to a register file† | Single-cycle |
| | Execute 2 | E2 | Load instructions: address is sent to memory† Store instructions and STP: address and data are STP sent to memory† Single-cycle instructions that saturate results set the SAT | Stores STP Multiplies |

TABLE 12-continued

Pipeline Phase Description

| Pipeline | Pipeline Phase | Symbol | During This Phase | Instruction Types Completed |
|---|---|---|---|---|
| | | | bit in the Control Status Register (CSR) if saturation occurs.† Multiply instructions: results are written to a register file† | |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

In this embodiment, multiplier units M1, M2 are each similar to the M-unit of FIG. 7 with paired multiply units. However, instead of utilizing an EMPY register to specify the operational parameters of a set of PEMPYxx instructions, this embodiment pre-selects a set of multiply instructions that can be executed by M1, M2, as listed in Table 10 and Table 11. One skilled in the art will recognize that other combinations of instructions can be preselected to execute on the multiplier of this embodiment.

Alternative Embodiment of Paired Multipliers

Figure 21:
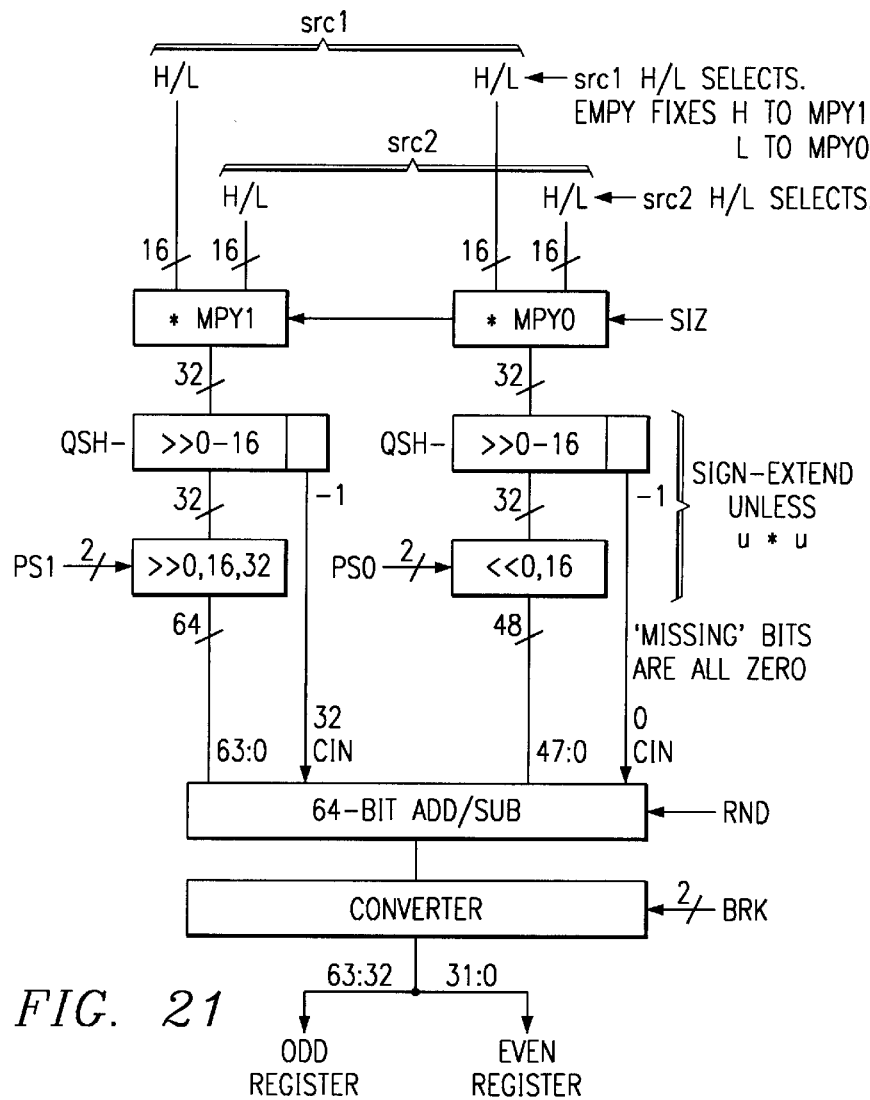
FIG. 21 is a block diagram of an alternative embodiment of paired multipliers that can be used in a digital system to embody the present invention.

FIG. 21 is a block diagram of an alternative embodiment of paired multipliers that can be used in a digital system to embody the present invention. In this embodiment, the M unit includes a pair of 16 by 16 multipliers mpy0, mpy1 and auxiliary hardware to enable a large number of multiply functions. M unit receives two register inputs (src1 and src2) and generates a 64 bit output to an even/odd pair of registers. Each multiplier receives two 16 bit inputs. These may be independently selected as the upper/lower 16 bits of the 32 bit data word recalled from the src1 and src2 operand registers. Each multiplier uses part of src1 and part of src2. The part used (upper/lower 16 bits) is independently selectable via op code. Each multiplier has a size input enabling selection of a single 16 by 16 bit multiply or a pair of 8 by 8 bit multiplies.

The redundant sign/magnitude coded output of the two multipliers go to shift and addition hardware. First, the 32-bit output of each multiplier goes to a corresponding one of a pair of 0–16 bit right shifters. These shifters are controlled in a ganged fashion from bits in the op code and are used primarily for result scaling in multiply accumulate operations to avoid overflow. Q shifters can couple most significant shifted out bit to a carry-in input of corresponding section of 64 bit adder/subtracter to implement rounded scaling.

The Q shifter output then goes to corresponding P shifters. The P shifters have fixed shift functions coded in op code. These are selected from a limited set of shifts. PS0 corresponding to mpy0 may select a 0 bit left shift or a 16 bit right shift. In the most general form these shift amounts can be separately applied to the upper/lower 16 bits of the data. However, only some of these combinations are coded. PS1 corresponding to inpy1 may select a 0 bit right shift, a 16 bit right shift or a 32 bit right shift, which may generally be applied to the separate upper/lower 16 bit parts but my be coded with more limited capability.

The output of the P shifters is supplied to a 64 bit adder/subtracter. The output of PS0 is generally supplied to the lower portion of the 64 bit adder/subtracter bits (47:0) depending upon the selected shift. Similarly, the output of PS1 is generally supplied to the upper portion of the 64 bit adder bits (63:0) depending upon the selected shift. This 64 bit adder/subtracter receives and may use for rounding the most significant shifted out bits of the Q shifters. The 64 bit adder operates in the redundant sign/magnitude coding output from the multiplier.

The sum output of the 64 bit adder/subtracter is the converted into the normal coding via a converter. This converter may be employed as a single 64 bit unit, two 32 bit units or four 16 bit units depending upon a BRK coding in the op code. The lower 32 bits (bits 31:0) are stored in the even register of a register pair. The upper 32 bits (bits 63:33) are stored in the odd register of the register pair.

Other System Examples

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 22:
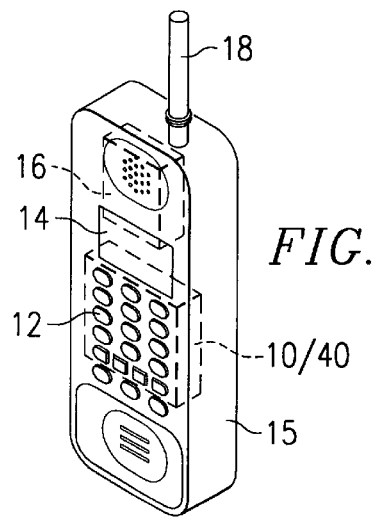
FIG. 22 is an illustration of a wireless telephone digital system that embodies the present invention.

FIG. 22 illustrates an exemplary implementation of an example of an integrated circuit 40 that includes digital system 1 in a mobile telecommunications device, such as a wireless telephone with integrated keyboard 12 and display 14. As shown in FIG. 22, digital system 1 with processor 10 is connected to the keyboard 12, where appropriate via a keyboard adapter (not shown), to the display 14, where appropriate via a display adapter (not shown) and to radio frequency circuitry 16. The radio frequency circuitry 16 is connected to an aerial 18.

Fabrication

Fabrication of digital system 30 or digital system 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality. An integrated circuit that includes any of the above embodiments includes a plurality of contacts for surface mounting. However, the integrated circuit could include other configurations, for example a plurality of pins on a lower surface of the circuit for mounting in a zero insertion force socket, or indeed any other suitable configuration.

Digital system 30 or digital system 1 contains hardware extensions for advanced debugging features. These assist in the development of an application system. Since these capabilities are part of the CPU core itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a pair of parallel 16×16 multipliers each with two 32-bit inputs and one 32-bit output. There are options to allow input halfword and byte selection for four independent 8×8 or two independent 16×16 multiplications, real and imaginary parts of complex multiplication, pairs of partial sums for 32×32 multiplication, and partial sums for 16×32 multiplication. There are options to allow internal hardwired routing of each multiplier unit results to achieve partial-sum shifting as required to support above options. There is a redundant digit arithmetic adder before final outputs to support additions for partial sum accumulation, complex multiplication vector accumulation and general accumulation for FIRs/IIRs— giving MAC unit functionality. There are options controlled using bit fields in a control register. passed to the multiplier unit as an operand. There are also options to generate all of the products needed for complex multiplication.

Advantageously, a single multiplication unit can be configured in response to a configuration EMPY register or in response to a preselected set of instructions to perform a variety of multiplication operations.

Advantageously, a multiply result can be selectively left-shifted and saturated for Q-point adjustment and for GSM support in a telecommunications vocoder, for example.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, more than two multiply circuits can be conjoined to provide even greater flexibility than a pair of multipliers. Other boundaries can be defined, such as a plurality of four bit multipliers, or a plurality of five bit multipliers, for example. A single .M unit can be embodied in a digital system, or more than two .M units can be embodied in a single digital system, for example.

It is therefore contemplated that the appended claims will cover any such modifications of the embodiments as fall within the true scope and spirit of the invention.

APPENDIX A

<u>pempy</u>

Description
The PEMPY instructions produce 64-bit results which are written to odd/even register pairs.
Registers A16–A31 and B16–B31 may contain the EMPY control word. The fields in the EMPY control word specify the signs of the operands, the alignment-shift and Q-shift amounts, and the breaks in the carry chain of the adder. The format of the EMPY control word is shown below.
The EMPY instruction also makes available a Galois multiply.
Functional Description

```
dword pempy( word mul1_op2, word mul10_op2, word mul1_op1, word mul0_op1, word emp )
{
    unsigned int oper;
    unsigned int gsize;
    unsigned int gpolynomial;
    uword gmh_op1, gmh_op2, gml_op1, gml_op2;
    dword result;
    oper = ( 0x3c000000 & emp ) >> 26;
    if ( oper >= 8 ) {
        gsize       = ( 0x1c000000 & emp ) >> 26;
        gpolynomial = ( 0x00ff0000 & emp ) >> 16;
        gmh_op1 =   (mul0_op1 >> 8) & 0xff;
        gmh_op2 =   (mul0_op2 >> 8) & 0xff;
        gml_op1 =    mul0_op1 & 0xff;
        gml_op2 =    mul0_op2 & 0xff;
        result.low =      (gmpy(gmh_op1, gmh_op2, gsize, gpolynomial) << 8) |
                          gmpy(gml._3op1, gml_op2, gsize, gpolynomial);
        result.high =     result.low;
}
else {
    result = empy(mul1_op1, mul1_op2, mul0_op1, mul0_op2, emp);
    return result;
}
```

<u>empy</u>

Description
This function does the non-Galois function of the PEMPYxx instructions. It does the multiplies, q-shifts, alignment-shifts and the final/converter functions.
Functional Description

```
dword empy(word mul1_op1, word mul1_op2, word mul0_op1, word mul0_op2, word emp)
{
    uword oper;
    uword m1_u1, m1_u2, m0_u1, m0_u2;
    uword qsh;
    uword rnd1, rnd0;
    uword as1, as0;
    uword as1_sign_lo, as0_sign_lo;
    uword b48, j32, b16;
    uword twos_c1, twos_c0;
    uword m1_s1_sign_lo;
    uword m0_s1_sign_lo;
    uword m1_s2_sign_lo;
    uword m0_s2_sign_lo;
    uword m1_signed, m0_signed;
    word mpy1_out, mpy0_out;
    dword fadd_out;
    dword as1_out, as0_out;
    dword result;
    /* extract controls from EMP register */
    twos_c1  = ( 0x3c000000 & emp ) >> 26; /* oper in bits (29:26) */
    b48      =( 0x01000000 & emp ) ? 1:0; /* b48   is bit 24 */
    j32      =( 0x00800000 & emp ) ? 1:0; /* j32   is bit 23 */
    b16      =( 0x00400000 & emp ) ? 1:0; /* b16   is bit 22 */
    gsh      = ( 0x001f0000 & emp ) >> 16; /* qsh   in bits(20:16) */
    rnd1     = ( 0x00002000 & emp ) ? 1:0; /* rnd1  is bit 13 */
    m1_u1    = ( 0x00001000 & emp ) ? 1:0; /* mul1 unsigned op1 is bit 12 */
    m1_u2    = ( 0x00000800 & emp ) ? 1:0; /* mul1 unsigned op2 is bit 11 */
    twos_c1  = ( 0x00000400 & emp ) ? 1:0; /* 2CP1 is bit 10 */
    as1      =( 0x00000300 & emp ) >> 8; /* as1    in bits (9:8) */
    rnd0     = ( 0x00000020 & emp ) ? 1:0; /* rnd0  is bit 5 */
    m0_u1    = ( 0x00000010 & emp ) ? 1:0; /* mul0 unsigned op1 is bit 4 */
    m0_u2    = ( 0x00000008 & emp ) ? 1:0; /* mul0 unsigned op2 is bit 3 */
    twos_c0  = ( 0x00000004 & emp ) ? 1:0; /* 2CP0 is bit 2 */
    as0      = ( 0x00000003 & emp )      ; /* as0    in bits ( 1: 0) */
    /* mpy 1 */
    mpy1_out = empy_mpy(mul1_op1, mul1_op2, m1_u1, m1_u2, oper, twos_c1);
    /* end mpy1 */
    /* mpy 0 */
    mpy0_out = empy_mpy(mul0_op1, mul0_op2, m0_u1, m0_u2, oper, twos_c0);
    /* end mpy0 */
    /* alignment-shift */
```

APPENDIX A-continued

```
        if (m1_u1)
            m1_s1_sign_lo = 0;
        else
            m1_s1_sign_lo = (0x00000080 & mul1_op1) >> 7;
        if (twos_c1)
            m1_s1_sign_lo = !m1_s1_sign_lo;
        if (m1_u2)
            m1_s2_sign_lo = 0;
        else
            m1_s2_sign_lo = (0x00000080 & mul1_op2) >> 7;
        (!(mul1_op1 & 0x000000ff) || !(mul1_op2 & 0x000000ff))
            as1_sign_lo = 0;
        else
            as1_sign_lo = m1_s1_sign_lo ^ m1_s2_sign_lo;
        if (m0_u1)
            m0_s1_sign_lo = 0;
        else
            m0_s1_sign_lo = (0x00000080 & mul0_op1) >> 7;
        if (twos_c0)
            m0_s1_sign_lo = !m0_s1_sign_lo;
        if (m0_u2)
            m0_s2_sign_lo = 0;
        else
            m0_s2_sign_lo = (0x00000080 & mul0_op2) >> 7;
        if (!(mul0_op1 & 0x000000ff) || !(mul0_op2 & 0x000000ff))
            as0_sign_lo = 0;
        else
            as0_sign_lo = m0_s1_sign_lo ^ m0_s2_sign_lo;
        as1_out = empy_as1(mpy1_out, as1, m1_u1, m1_u2, b16, j32, b48, as1_sign_lo);
        as0_out = empy_as0(mpy0_out, as0, m0_u1, m0_u2, b16, j32, b48, as0_sign_lo);
        /* end alignment-shift */
        /* final add/converter */
        fadd_out = empy_finaladd(oper, as1_out, as0_out, rnd1, rnd0, qsh, b16, j32, b43);
        /* end final add/converter */
        /* qshift */
        m1_signed = !m1_u1 || !m1_u2;
        m0_signed = !m0_u1 || !m0_u2;
        result = empy_qsh(fadd_out, qsh, m1_signed, m0_signed, j32);
        /* end qshift */
        return result;
        /* end final add/converter */
}
empy_as0

Description
This function does the alignment-shifting for MPY0 of the PEMPYxx instructions.
Functional Description
dword empy_as0(word opnd, word as, word unsign1, word unsign2, word b16, word j32, word b4
{
    dword result;
    switch (as) {
        case 0: /* no shifts */
            if ( ( ( !unsign1 || !unsign2 ) && ( 0x80000000 & opnd ) && j32 ) {
                result.high = 0x0000ffff;
                if ( !b48 )
                    result.high |= 0xffff0000;
            }
            else
                result.high = 0;
            result.low = opnd;
            break;
        case 1: /* bits(31:16) shift left 16; bits(15:0) no shift */
            result.high = ((uword) opnd) >> 16;
            if ( ( ( ?unsign1 || !unsign2 ) && ( 0x80000000 & opnd ) && !b48 )
                result.high |= 0xffff0000;
            result.low = opnd & 0x0000ffff;
            if ( ( ( !unsign1 || !unsign2 ) && ( sign_lo ) && !b16 )
                result.low |= 0xffff0000;
            break;
        case 2: /* left shift 16 */
            result.high = ( (uword) opnd ) >> 16;
            if ( ( ( !unsign1 || !unsign2 ) && ( 0x80000000 & opnd ) && !b48 )
                result.high |= 0xffff0000;
            result.low = opnd << 16;
    }
    return result;
}
empy_as1
```

APPENDIX A-continued

Description
This function does the alignment-shifting for MPY1 of the PEMPYxx instructions.
Functional Description
dword empy_as1(word opnd, word as, word unsigh1, word unsign2, word b16, word j32, word b4
{
    dword result;
    switch (as) {
        case 0: /* no shift */
            result.high = opnd ;
            result.low = 0;
            break;
        case 1: /* shift right 16 */
            result.high = ((uword) opnd) >> 16;
            if ( ( !unsign1 || !unsign2 ) && ( 0x80000000 & opnd ) && !b48 )
                result.high |= 0xffff0000;
            result.low = opnd << 16;
            break;
        case 2: /* bits (31:16) shift right 16; bits(15:0) shift right 32 */
            result.high = ((uword) opnd) >> 16;
            if ( ( !unsign1 || !unsign2 ) && ( 0x80000000 & opnd ) && !b48 )
                result.high |= 0xffff0000;
            result.low = opnd & 0x0000ffff;
            if ( ( !unsign1 || !unsign2 ) && ( sign_lo ) && !b16 )
                result.low |= 0xffff0000;
            break;
        case 3: /* shift right 32 */
            if ( ( !unsign1 || !unsign2 ) && ( 0x80000000 & opnd ) && j32 ) {
                result.high = 0x0000ffff;
                if ( !b48 )
                    result.high |= 0xffff0000 ;
            }
            else
                result.high = 0;
            result.low = opnd;
    }
    return result;
}
empy_finaladd Description
This function does the final adding/converting for MPY0 of the PEMPYxx instructions.
Functional Description
dword empy_finaladd(uword oper, dword opnd1, dword opnd0, uword rnd1, uword rnd0, uword q
{
    dword result;
    word tmp0, tmp1;
    word round_low, round_high;
    int co;
    if ( qsh > 16 ) qsh -= 16;
    round_high =0;
    if ( (qsh == 0) || (oper == 1) )
        round_low = 0 ;
    else
        round_low = 1 << (qsh-1);
    if ( !j32 )
        round_high = round_low;
    result.low = ( 0x0000ffff & opnd1.low ) + ( 0x0000ffff & opnd0.low );
    if ( rnd0 ) result.low += round_low;
    if ( b16 )
        result.low &= 0x0000ffff;
    tmp1 = 0xffff0000 & opnd1.low;
    tmp0 = 0xffff0000 & opnd0.low;
    co = ( (result.low >> 16) + (((uword)tmp0) >> 16) + (((uword)tmp1) >> 16) ) >> 16;
    result.low += tmp0 + tmp1 ;
    result.high = ( 0x0000ffff & opnd1.high ) + ( 0x0000ffff & opnd0.high );
    if ( rnd1 ) result.high += round_high;
    if ( j32 ) result.high += co;
    if ( b48 ) result.high &= 0x0000ffff;
    result.high += ( 0xffff0000 & opnd1.high ) + ( 0xffff0000 & opnd0.high );
    return result;
}
empy_mpy Description
This function does the multiplications of the PEMPYxx instructions.
Functional Description
word empy_mpy(word op1, word op2, word unsign1, word unsign2, word oper, word tws_c)
{
    word op1_hi.op1_lo;

APPENDIX A-continued

```
        word result;
        if ( oper == 1 ) ( /* 2 8*8 multiplies */
            if ( twos_c ) {
                op1_lo = unsign1 ? -(ubyte0(op1)) : -(sbyte0(op1));
                op1_hig = unsign1 ? -(ubyte1(op1)) : -(sbyte1(op1));
            }
            else {
                op1_lo = unsign1 ? ubyte0(op1) : sbyte0(op1);
                op1_hi = unsign1 ? ubyte1(op1) : sbyte1(op1);
            }
            if ( unsign2 ) {
                result = ( op1_lo * ubyte0(op2) ) & 0x0000ffff;
                result |= ( op1_hi * ubyte1(op2) ) << 16;
            }
            else {
                result = ( op1_lo * sbyte0(op2) ) & 0x0000ffff;
                result |= ( op1_hi * sbyte1(op2) ) << 16;
            }
        }
        else if ( oper == 0 ) { /* 1 16*16 multiply */
            if ( twos_c )
                op1_lo = unsign1 ? -(ulow16(op1)) : -(slo16(op1));
            else
                op1_lo = unsign1 ? ulow16(op1) : slow16(op1) ;
            if ( unsign2 )
                result = op1._3lo * ulow16(op2);
            else
                result = op1_lo * slow16(op2);
        }
        return result;
}
empy_qsh Description
This function does the q-shifting of the PEMPYxx instructions.
Functional Description
dword empy_qsh(dword opnd, word qsh, word sign1, word sign0, word j32)
{
    dword result;
    if ( qsh > 16 ) qsh = 16;
    if ( qsh == 0 ) {
        result.high = opnd.high;
        result.low = opnd.low ;
    }
    else {
        if ( j32 ) {
            result.low = ((uword) opnd.low) >> qsh;
            result.low |= ((word) opnd.high) << (32-qsh);
            if ( sign1 || sign0 )
                result.high = ((word) opnd.high) >> qsh;
            else
                result.high = ((uword) opnd.high) >> qsh;
        }
        else {
            if ( sign1 )
                result.high = ((word) opnd.high) >> qsh;
            else
                result.high = ((uword) opnd.high) >> qsh;
            if ( sign0 )
                result.low = ((word) opnd.low) >> qsh;
            else
                result.low = ((uword) opnd.low) >> qsh;
        }
    }
    return result;
}
gmpy Description
This function does the Galois function of the PEMPYxx instructions.
Functional Description
word gmpy(uword op1, uword op2, unsigned int size, unsigned int polynomial)
{
    word bd;
    uword pp[8];
    word prod;
    word mask, 1bd;
    int i;
    op2 = (op2 >> 7-size) << 7-size; /* zero bits beyond the size on right */
```

APPENDIX A-continued

```
    bd = 0x00000001;
    for ( i=0; i<8; i++ ) {
        if ( op2 & bd )
            pp[i] = op1 << i;
        else
            pp[i] = 0;
        bd <<= 1;
    }
    prod = pp[0] ^ pp[1] ^ pp[2] ^ pp[3] ^ pp[4] ^ pp[5] ^ pp[6] ^ pp[7];
    mask = ( 0x00000100 | polynomial ) << 6;
    1bd = 0x00004000;
    for ( i=0; i<size; i++ ) {
        if ( prod & 1bd )
            prod ^= mask;
        mask >>= 1;
        1bd >>= 1;
    }
    prod >>= 7-size;
    prod &= 0xffffffff << (7-size) ;
    return prod ;
}
```

What is claimed is:

1. A data processing apparatus operating in response to predetermined instructions comprising:

a first data source;

a second data source;

a first multiplier circuit connected to said first data source and said second data source, said first multiplier circuit forming a first product of an instruction selected portion of said first data source and an instruction selected portion of said second data source;

a first shifter connected to said first multiplier circuit forming a first shifted output of said first product having an instruction specified shift amount;

a second multiplier circuit connected to said first data source and said second data source, said second multiplier circuit forming a second product of an instruction selected portion of said first data source and an instruction selected portion of said second data source;

a second shifter connected to said second multiplier circuit forming a second shifted output of said second product having an instruction specified shift amount; and an arithmetic circuit connected to said first shifter and to said second shifter forming an instruction selected arithmetic combination of said first shifted product applied to most significant bits and said second shifted product applied to least significant bits.

2. The data processing apparatus of claim 1, wherein:

said first data source has N bits;

said second data source has N bits;

said instruction selected portion of said first data source of said first multiplier circuit is a selected one of N/2 most significant bits of said first data source and N/2 least significant bits of said first data source;

said instruction selected portion of said second data source of said first multiplier circuit is a selected one of N/2 most significant bits of said second data source and N/2 least significant bits of said second data source;

said instruction selected portion of said first data source of said second multiplier circuit is a selected one of N/2 most significant bits of said first data source and N/2 least significant bits of said first data source; and said instruction selected portion of said second data source of said second multiplier circuit is a selected one of N/2 most significant bits of said second data source and N/2 least significant bits of said second data source.

3. The data processing apparatus of claim 1, wherein:

said first data source has N bits;

said second data source has N bits;

said instruction specified shift of said first shifter is a selected one of no shift, a right shift of N/2 bits and a right shift of N bits; and said instruction specified shift of said second shifter is a selected one of no shift and a left shift of N/2 bits.

4. The data processing apparatus of claim 1, further comprising:

a third shifter disposed between said first multiplier circuit and said first shifter forming a third shifted output of said first product having an instruction specified right shift amount of zero to N/2 bits; and a forth shifter disposed between said second multiplier circuit and second shifter forming a fourth shifted output of said second product having said instruction specified right shift amount of zero to N/2 bits.

5. The data processing apparatus of claim 4, wherein:

said third shifter includes a first rounding output of a most significant shifted out bit according to said instruction specified right shift amount;

said fourth shifter includes a second rounding output of a most significant shifted out bit according to said instruction specified right shift amount; and said arithmetic circuit receives said first roundingoutput from said third shifter, said second rounding output from said fourth shifter and a rounding control input, said arithmetic circuit supplying said first rounding output to a carry input of a carry input of a zeroth bit and supplying said second rounding output to a carry input of a Nth bit when said rounding control input indicates a rounding operation.

6. The data processing apparatus of claim 1, wherein:

said first data source has N bits;

said second data source has N bits; and said data processing apparatus further comprising a third shifter receiving said arithmetic combination of said arithmetic circuit forming a third shifted output of said arithmetic combination having an instruction specified right shift amount of zero to N/2 bits.

7. The data processing apparatus of claim 1, wherein:

said first data source has N bits;

said second data source has N bits;

said instruction selected portion of said first data source of said first multiplier circuit is a selected one of N/2 most significant bits of said first data source and N/2 least significant bits of said first data source;

said instruction selected portion of said second data source of said first multiplier circuit is a selected one of N/2 most significant bits of said second data source and N/2 least significant bits of said second data source;

said instruction selected portion of said first data source of said second multiplier circuit is a selected one of N/2 most significant bits of said first data source and N/2 least significant bits of said first data source;

said instruction selected portion of said second data source of said second multiplier circuit is a selected one of N/2 most significant bits of said second data source and N/2 least significant bits of said second data source;

said instruction specified shift of said first shifter consists of no shift;

said instruction specified shift of said second shifter consists of no shift; and said instruction selected combination of said first shifted product and said second shifted product of said arithmetic circuit consists of concatenation of said first shifted product as most significant bits and said second shifted product as least significant bits.

8. The data processing apparatus of claim 1, wherein:

said first data source has N bits;

said second data source has N bits;

said instruction selected portion of said first data source of said first multiplier circuit is N/2 most significant bits of said first data source;

said instruction selected portion of said second data source of said first multiplier circuit is N/2 most significant bits of said second data source;

said instruction selected portion of said first data source of said second multiplier circuit is N/2 least significant bits of said first data source;

said instruction selected portion of said second data source of said second multiplier circuit is N/2 least significant bits of said second data source;

said instruction specified shift of said first shifter consists of a right shift of N bits;

said instruction specified shift of said second shifter consists of no shift; and said instruction selected combination of said first shifted product and said second shifted product of said arithmetic circuit consists of a sum of said first shifted product and said second shifted product.

9. The data processing apparatus of claim 1, wherein:

said first data source has N bits;

said second data source has N bits;

said instruction selected portion of said first data source of said first multiplier circuit is N/2 most significant bits of said first data source;

said instruction selected portion of said second data source of said first multiplier circuit is N/2 most significant bits of said second data source;

said instruction selected portion of said first data source of said second multiplier circuit is N/2 least significant bits of said first data source;

said instruction selected portion of said second data source of said second multiplier circuit is N/2 least significant bits of said second data source;

said instruction specified shift of said first shifter consists of a right shift of N bits;

said instruction specified shift of said second shifter consists of no shift; and said instruction selected combination of said first shifted product and said second shifted product of said arithmetic circuit consists of a difference of said second shifted product subtracted from said first shifted product.

10. The data processing apparatus of claim 1, wherein:

said first data source has N bits;

said second data source has N bits;

said instruction selected portion of said first data source of said first multiplier circuit is N/2 most significant bits of said first data source;

said instruction selected portion of said second data source of said first multiplier circuit is N/2 least significant bits of said second data source;

said instruction selected portion of said first data source of said second multiplier circuit is N/2 least significant bits of said first data source;

said instruction selected portion of said second data source of said second multiplier circuit is N/2 most significant bits of said second data source;

said instruction specified shift of said first shifter consists of a right shift of N bits;

said instruction specified shift of said second shifter consists of no shift; and said instruction selected combination of said first shifted product and said second shifted product of said arithmetic circuit consists of a sum of said first shifted product and said second shifted product.

11. The data processing apparatus of claim 1, wherein:

said first data source has N bits;

said second data source has N bits;

said instruction selected portion of said first data source of said first multiplier circuit is N/2 most significant bits of said first data source;

said instruction selected portion of said second data source of said first multiplier circuit is N/2 most significant bits of said second data source;

said instruction selected portion of said first data source of said second multiplier circuit is N/2 most significant bits of said first data source;

said instruction selected portion of said second data source of said second multiplier circuit is N/2 least significant bits of said second data source;

said instruction specified shift of said first shifter consists of no shift;

said instruction specified shift of said second shifter consists of a left shift of N/2 bits; and said instruction selected combination of said first shifted product and said second shifted product of said arithmetic circuit consists of a sum of said first shifted product and said second shifted product.

12. The data processing apparatus of claim 1, wherein:

said first data source has N bits;

said second data source has N bits;

said instruction selected portion of said first data source of said first multiplier circuit is N/2 least significant bits of said first data source;

said instruction selected portion of said second data source of said first multiplier circuit is N/2 most significant bits of said second data source;
said instruction selected portion of said first data source of said second multiplier circuit is N/2 least significant bits of said first data source;
said instruction selected portion of said second data source of said second multiplier circuit is N/2 least significant bits of said second data source;
said instruction specified shift of said first shifter consists of a right shift of N/2 bits;
said instruction specified shift of said second shifter consists of no shift; and
said instruction selected combination of said first shifted product and said second shifted product of said arithmetic circuit consists of a sum of said first shifted product and said second shifted product.

13. The data processing apparatus of claim 1, wherein:
said first data source has N bits;
said second data source has N bits;
said instruction selected portion of said first data source of said first multiplier circuit is N/2 most significant bits of said first data source;
said instruction selected portion of said second data source of said first multiplier circuit is N/2 most significant bits of said second data source;
said instruction selected portion of said first data source of said second multiplier circuit is N/2 least significant bits of said first data source;
said instruction selected portion of said second data source of said second multiplier circuit is N/2 least significant bits of said second data source;
said first multiplier circuit forms said first product as a concatenation of a third product of N/4 most significant bits of said first data source and N/4 most significant bits of said second data source as most significant bits and a fourth product of N/4 second most significant bits of said first data source and N/4 second most significant bits of said second data source as least significant bits;
said second multiplier circuit forms said second product as a concatenation of a fifth product of N/4 second least significant bits of said first data source and N/4 second least significant bits of said second data source as most significant bits and a sixth product of N/4 least significant bits of said first data source and N/4 least significant bits of said second data source as least significant bits;
said instruction specified shift of said first shifter consists of a right shift of N/2 bits;
said instruction specified shift of said second shifter consists of no shift; and
said instruction selected combination of said first shifted product and said second shifted product of said arithmetic circuit consists of a concatenation of said third product at N/2 most significant bits, said fourth product as N/2 second most significant bits, said fifth product as N/2 second least significant bits and said sixth product as N/2 least significant bits.

14. The data processing apparatus of claim 1, wherein:
said first data source has N bits;
said second data source has N bits;
said instruction selected portion of said first data source of said first multiplier circuit is N/2 most significant bits of said first data source;

said instruction selected portion of said second data source of said first multiplier circuit is N/2 most significant bits of said second data source;
said instruction selected portion of said first data source of said second multiplier circuit is N/2 least significant bits of said first data source;
said instruction selected portion of said second data source of said second multiplier circuit is N/2 least significant bits of said second data source;
said first multiplier circuit forms said first product as a concatenation of a third product of N/4 most significant bits of said first data source and N/4 most significant bits of said second data source as most significant bits and a fourth product of N/4 second most significant bits of said first data source and N/4 second most significant bits of said second data source as least significant bits;
said second multiplier circuit forms said second product as a concatenation of a fifth product of N/4 second least significant bits of said first data source and N/4 second least significant bits of said second data source as most significant bits and a sixth product of N/4 least significant bits of said first data source and N/4 least significant bits of said second data source as least significant bits;
said, instruction specified shift of said first shifter consists of a right shift of N/2 bits of most significant bits of said third product and a right shift of N bits of said fourth product;
said instruction specified shift of said second shifter consists of a left shift of N/2 bits of said fifth product and not shift of said sixth product; and
said instruction selected combination of said first shifted product and said second shifted product of said arithmetic circuit consists of a concatenation of a first sum of said third product and said fifth product as most significant bits and a second sum of said fourth product and said sixth product as least significant bits.

15. The data processing apparatus of claim 1, wherein:
said first data source has N bits;
said second data source has N bits;
said instruction selected portion of said first data source of said first multiplier circuit is N/2 most significant bits of said first data source;
said instruction selected portion of said second data source of said first multiplier circuit is N/2 most significant bits of said second data source;
said instruction selected portion of said first data source of said second multiplier circuit is N/2 least significant bits of said first data source;
said instruction selected portion of said second data source of said second multiplier circuit is N/2 least significant bits of said second data source;
said first multiplier circuit forms said first product as a concatenation of a third product of N/4 most significant bits of said first data source and N/4 most significant bits of said second data source as most significant bits and a fourth product of N/4 second most significant bits of said first data source and N/4 second most significant bits of said second data source as least significant bits;
said second multiplier circuit forms said second product as a concatenation of a fifth product of N/4 second least significant bits of said first data source and N/4 second least significant bits of said second data source as most significant bits and a sixth product of N/4 least significant bits of said first data source and N/4 least significant bits of said second data source as least significant bits;

said instruction specified shift of said first shifter consists of a right shift of N/2 bits of said third product and no shift of said fourth product;

said instruction specified shift of said second shifter consists of a right shift or N/2 bits of said fifth product no shift of said sixth product; and said instruction selected combination of said first shifted product and said second shifted product of said arithmetic circuit consists of a concatenation of a first sum of said third product and said fourth product as most significant bits and a second sum of said fifth product and said sixth product as least significant bits.

16. The data processing apparatus of claim 1, further comprising:

a register file including
  a plurality of data registers for storing data,
  a first output for recalling from a first instruction specified data register data stored therein, thereby forming said first data source,
  a second output for recalling form a second instruction specified data register data stored therein, thereby forming said second data source, and
an instruction specified one of said plurality of data registers being an extended multiply control data register storing therein data controlling
  said instruction selected portion of said first data source and said instruction selected portion of said second data source supplied to said first multiplier circuit,
  said instruction selected portion of said first data source and said instruction selected portion of said second data source supplied to said second multiplier circuit,
  said instruction specified shift amount of said first shifter,
  said instruction specified shift amount of said second shifter, and
  said instruction selected arithmetic combination of said arithmetic circuit.

* * * * *